United States Patent
Sauder et al.

(10) Patent No.: US 9,943,027 B2
(45) Date of Patent: Apr. 17, 2018

(54) SYSTEMS, METHODS, AND APPARATUS FOR AGRICULTURAL IMPLEMENT TRENCH DEPTH CONTROL AND SOIL MONITORING

(71) Applicant: PRECISION PLANTING LLC, Tremont, IL (US)

(72) Inventors: Derek Sauder, Tremont, IL (US); Jason Stoller, Morton, IL (US); Troy Plattner, Goodfield, IL (US)

(73) Assignee: Precision Planting LLC, Tremont, IL (US)

( * ) Notice: Subject to any disclaimer, the term of this patent is extended or adjusted under 35 U.S.C. 154(b) by 312 days.

(21) Appl. No.: 14/776,504

(22) PCT Filed: Mar. 14, 2014

(86) PCT No.: PCT/US2014/029352
§ 371 (c)(1),
(2) Date: Sep. 14, 2015

(87) PCT Pub. No.: WO2014/153157
PCT Pub. Date: Sep. 25, 2014

(65) Prior Publication Data
US 2016/0037709 A1      Feb. 11, 2016

Related U.S. Application Data

(60) Provisional application No. 61/783,591, filed on Mar. 14, 2013.

(51) Int. Cl.
*G01M 1/38*        (2006.01)
*A01C 5/06*        (2006.01)
(Continued)

(52) U.S. Cl.
CPC .............. *A01C 5/062* (2013.01); *A01C 7/203* (2013.01); *A01C 21/007* (2013.01); *G05B 15/02* (2013.01); *A01C 5/068* (2013.01)

(58) Field of Classification Search
CPC ....... A01C 5/062; A01C 7/203; A01C 21/007; A01C 15/02
See application file for complete search history.

(56) References Cited

U.S. PATENT DOCUMENTS

| | | |
|---|---|---|
| 2,366,389 A | 1/1945 | Deavenport |
| 3,749,035 A | 7/1973 | Cayton et al. |

(Continued)

FOREIGN PATENT DOCUMENTS

| | | |
|---|---|---|
| DE | 4121218 A1 | 3/1992 |
| GB | 2126062 A | 3/1986 |

(Continued)

OTHER PUBLICATIONS

Developments in Soil Science, vol. 31 P. Lagacherie, A.B. McBratney and M. Voltz (Editors) Chapter 17 Visible-NIR Hyperspectral Imagery for Discriminating Soil Types in the La Peyne Watershed (France) J.S. Madeira Netto, J.-M. Robbez-Massony and E Martins.

(Continued)

*Primary Examiner* — Vincent Tran
(74) *Attorney, Agent, or Firm* — Thomas J. Oppold; Larkin Hoffman Daly & Lindgren, Ltd.

(57) ABSTRACT

Systems, methods and apparatus are provided for monitoring soil properties including soil moisture and soil temperature during an agricultural input application. Embodiments include a soil moisture sensor and/or a soil temperature sensor mounted to a seed firmer for measuring moisture and temperature in a planting trench. Additionally, systems, (Continued)

methods and apparatus are provided for adjusting depth based on the monitored soil properties.

20 Claims, 29 Drawing Sheets

(51) Int. Cl.
  *A01C 7/20* (2006.01)
  *G05B 15/02* (2006.01)
  *A01C 21/00* (2006.01)

(56) References Cited

U.S. PATENT DOCUMENTS

| | | | |
|---|---|---|---|
| 3,910,701 | A | 10/1975 | Henderson et al. |
| 4,374,500 | A | 2/1983 | Westerfield |
| 4,413,685 | A | 11/1983 | Gremelspacher et al. |
| 5,038,040 | A | 8/1991 | Funk et al. |
| 5,044,756 | A | 9/1991 | Gaultney et al. |
| 5,355,815 | A | 10/1994 | Monson |
| 5,461,229 | A | 10/1995 | Sauter et al. |
| 5,563,340 | A | 10/1996 | Clowater et al. |
| 5,621,666 | A | 4/1997 | O'Neall et al. |
| 5,852,982 | A | 12/1998 | Peter |
| 5,887,491 | A | 3/1999 | Monson et al. |
| 5,931,882 | A | 8/1999 | Fick et al. |
| 5,956,255 | A | 9/1999 | Flamme |
| 6,016,714 | A | 1/2000 | Smith et al. |
| 6,148,747 | A | 11/2000 | Deckler et al. |
| 6,216,794 | B1 | 4/2001 | Buchl |
| 6,389,999 | B1 | 5/2002 | Duello |
| 6,530,334 | B2* | 3/2003 | Hagny .............. A01C 7/006 111/189 |
| 6,596,996 | B1 | 7/2003 | Stone et al. |
| 6,608,672 | B1 | 8/2003 | Shibusawa et al. |
| 6,827,029 | B1 | 12/2004 | Wendte |
| 7,726,251 | B1 | 6/2010 | Peterson et al. |
| 7,849,955 | B2 | 12/2010 | Grabill et al. |
| 8,816,262 | B2 | 8/2014 | Holland |
| 8,909,436 | B2 | 12/2014 | Achen et al. |
| 2002/0131046 | A1 | 9/2002 | Christy et al. |
| 2003/0016029 | A1 | 1/2003 | Schuler et al. |
| 2004/0255834 | A1 | 12/2004 | Schaffert |
| 2006/0158652 | A1 | 7/2006 | Rooney et al. |
| 2007/0272134 | A1 | 11/2007 | Baker et al. |
| 2009/0112475 | A1 | 4/2009 | Christy et al. |
| 2010/0023430 | A1 | 1/2010 | Hunter et al. |
| 2010/0180695 | A1 | 7/2010 | Sauder et al. |
| 2012/0012041 | A1* | 1/2012 | Schaffert .............. A01O 5/062 111/118 |
| 2012/0042813 | A1 | 2/2012 | Liu et al. |
| 2013/0093580 | A1 | 4/2013 | Chaney |
| 2013/0104785 | A1* | 5/2013 | Achen .............. A01O 5/062 111/157 |
| 2013/0112122 | A1* | 5/2013 | Blomme .............. A01O 5/062 111/149 |
| 2013/0125800 | A1* | 5/2013 | Landphair .............. A01B 79/005 111/149 |
| 2013/0180742 | A1* | 7/2013 | Wendte .............. A01B 63/008 172/4 |
| 2013/0250305 | A1 | 9/2013 | Holland |
| 2014/0343802 | A1* | 11/2014 | Pichlmaier .............. A01B 63/112 701/50 |
| 2015/0094917 | A1* | 4/2015 | Blomme .............. A01C 21/005 701/50 |

FOREIGN PATENT DOCUMENTS

| | | |
|---|---|---|
| WO | 200186352 A1 | 10/2001 |
| WO | 2012129442 | 9/2012 |
| WO | 2012149398 A1 | 11/2012 |
| WO | 2012149415 A1 | 11/2012 |

OTHER PUBLICATIONS

1993 American Society ot Agricultural Engineers 0001-2351/ 93 / 36606-1/03 Gaultney, L.D. Soil Moisture Sensor for Predicting Seed Planting Depth vol. 36(6): 1703-1711—Nov.-Dec. 1993.

Adamchuk, Dr. V.I., Characterizing Soil Variability Using On-the-Go Sensing Technology. Site-Specific Management Guideline. Lincoln, Nebraska. SSMG-44. 2005-2006. pp. 1-4.

Grisso et al., Precision Farming Tools: Variable-Rate Application. Virginia Cooperative Extension. Virginia Polytechnic Institute and State University. Publication 442-505. pp. 1-16, 2011.

Sudduth et al. Portable, Near-Infrared Spectrophotometer for Rapid Soil Analysis. Transactions of ASAE vol. 36(1) pp. 185-193, Jan.-Feb. 1993.

Adamchuk et al. On-the-Go Capacitance Sensing of Soil Water Content. 2009 ASABE Mid-Central Conference. Ames, Iowa. Paper No. MC09-201. Apr. 4-5, 2009.

Adamchuk et al. On-the-Go Soil Sensors for Precision Agriculture. Computers and Electronics in Agriculture 44 (2004) pp. 71-91.

Adamchuk et al. On-the-Go Vehicle-Based Soil Sensors. University of Nebraska Cooperative Extension EC 02-178. Apr. 27, 2007.

Maleki et al. Optimisation of Soil VIS-NIR Sensor-Based Variable Rate Application System of Soil Phosphorus. Soil & Tillage Research 94 (2007) pp. 239-250.

Morgan, Mark T. Precision Farming: Sensors vs. Map-Based. Agricultural and Biological Engineering Department. pp. 1-2, Apr. 1995.

Schirrmann et al. Soil pH Mapping with an On-the-Go Sensor. doi:10-3990/s110100573, pp. 573-598, published Jan. 7, 2011.

Hummel et al. Soil Moisture and Organic Matter Prediction of Surface and Subsurface Soils Using an NIR Soil Sensor. Computers and Electronics in Agriculture 32 (2001) pp. 149-165.

Sudduth et al. Soil organic matter, CEC and Moisture Sensing with a Portable NIR Spectrophotometer. Transactions of ASAE vol. 36(6) pp. 1571-1582, Nov.-Dec. 1993.

Hummel et al. Soil Property Sensing for Site-Specific Crop Management. Computers and Electronics in Agriculture 14 (1996) pp. 121-136.

Ess et al. Implementing Site-Specific Management: Map -Versus Sensor- Based Variable Rate Application. Department of Agricultural and Biological Engineering. Purdue University. pp. 1-9, 2001.

* cited by examiner

SYSTEMS, METHODS, AND APPARATUS FOR AGRICULTURAL IMPLEMENT TRENCH DEPTH CONTROL AND SOIL MONITORING

BACKGROUND

In recent years, the availability of advanced location-specific agricultural application and measurement systems (used in so-called "precision farming" practices) has increased grower interest in determining spatial variations in soil properties and in varying input application variables (e.g., planting depth) in light of such variations. However, the available mechanisms for measuring properties such as temperature are either not effectively locally made throughout the field or are not made at the same time as an input (e.g. planting) operation. Moreover, available methods for adjusting depth are not effectively responsive to changes in soil properties such as depth and temperature.

Thus there is a need in the art for a method for monitoring soil properties during an agricultural input application. Moreover, there is a need in the art for adjusting depth based on the monitored soil properties.

DESCRIPTION

Depth Control and Soil Monitoring System

Figure 1:
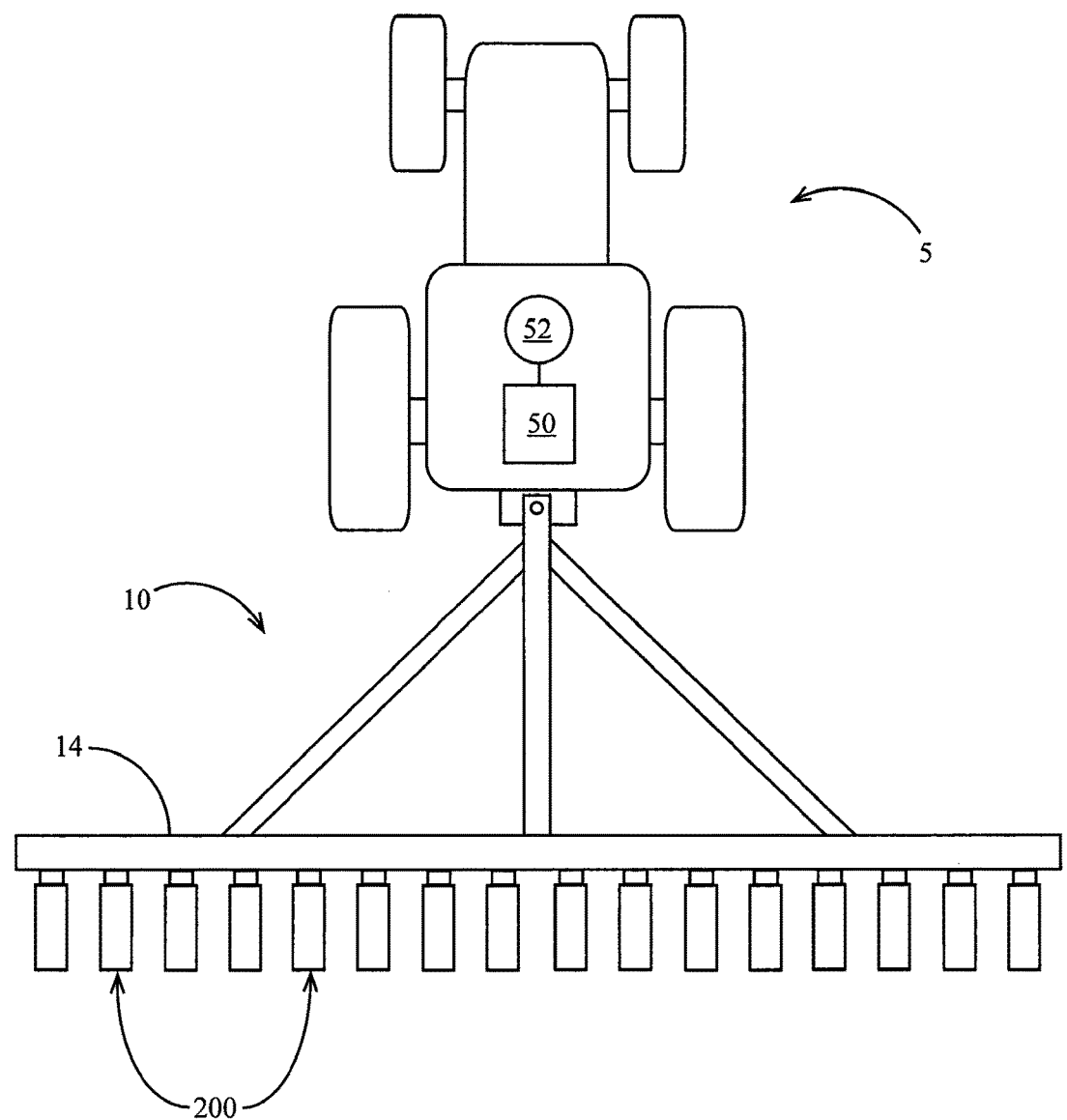
FIG. 1 is a top view of an embodiment agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 10. A global positioning system ("GPS") receiver 52 is preferably mounted to the tractor 10.

Figure 2:
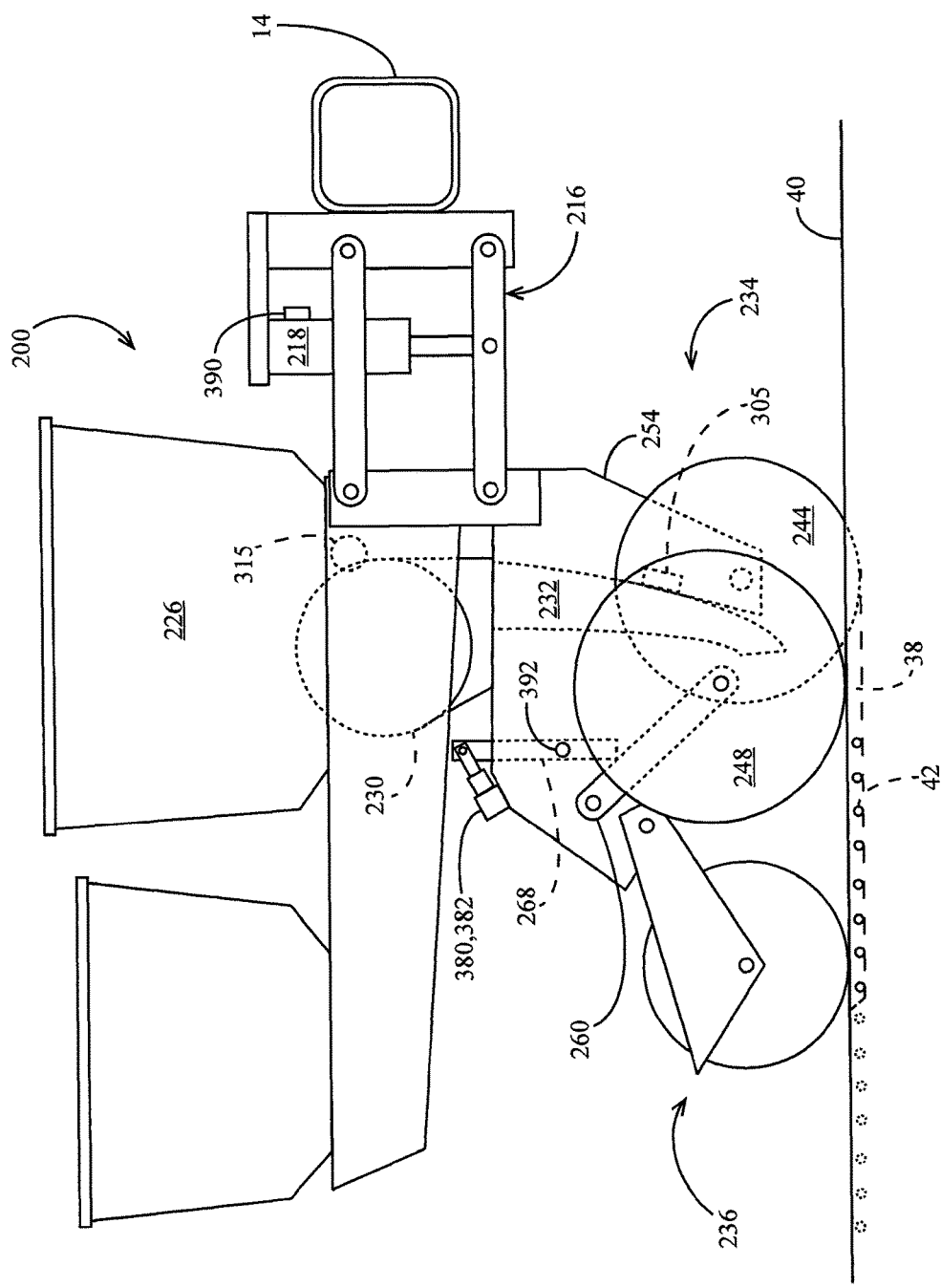
FIG. 2 is a side elevation view of an embodiment of a planter row unit.

Turing to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve 390 is preferably in fluid communication with the actuator 218 for modifying the lift and/or downforce applied by the actuator. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A depth adjustment actuator 380 is preferably configured to modify a position of the depth adjustment rocker 268 and thus the height of the gauge wheels 248. The actuator 380 is preferably a linear actuator mounted to the row unit 200 and pivotally coupled to an upper end of the rocker 268. In some embodiments the depth adjustment actuator 380 comprises a device such as that disclosed in International Patent Application No. PCT/US2012/035585, the disclosure of which is hereby incorporated herein by reference. An encoder 382 is preferably configured to generate a signal related to the linear extension of the actuator 380; it should be appreciated that the linear extension of the actuator 380 is related to the depth of the trench 38 when the gauge wheel arms 260 are in contact with the rocker 268. A downforce sensor 392 is preferably configured to generate a signal related to the amount of force imposed by the gauge wheels 248 on the soil 40; in some embodiments the downforce sensor 392 comprises an instrumented pin about which the rocker 268 is pivotally coupled to the row unit 200, such as those instrumented pins disclosed in Applicant's co-pending U.S. patent application Ser. No. 12/522,253 (Pub. No. US 2010/0180695), the disclosure of which is hereby incorporated herein by reference.

Continuing to refer to FIG. 2, a seed meter 230 such as that disclosed in Applicant's co-pending International Patent Application No. PCT/US2012/030192, the disclosure of which is hereby incorporated herein by reference, is preferably disposed to deposit seeds 42 from a hopper 226 into the trench 38, e.g., through a seed tube 232 disposed to guide the seeds toward the trench. In some embodiments, the meter is powered by an electric drive 315 configured to drive a seed disc within the seed meter. In other embodiments, the drive 315 may comprise a hydraulic drive configured to drive the seed disc. A seed sensor 305 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

Figure 3:
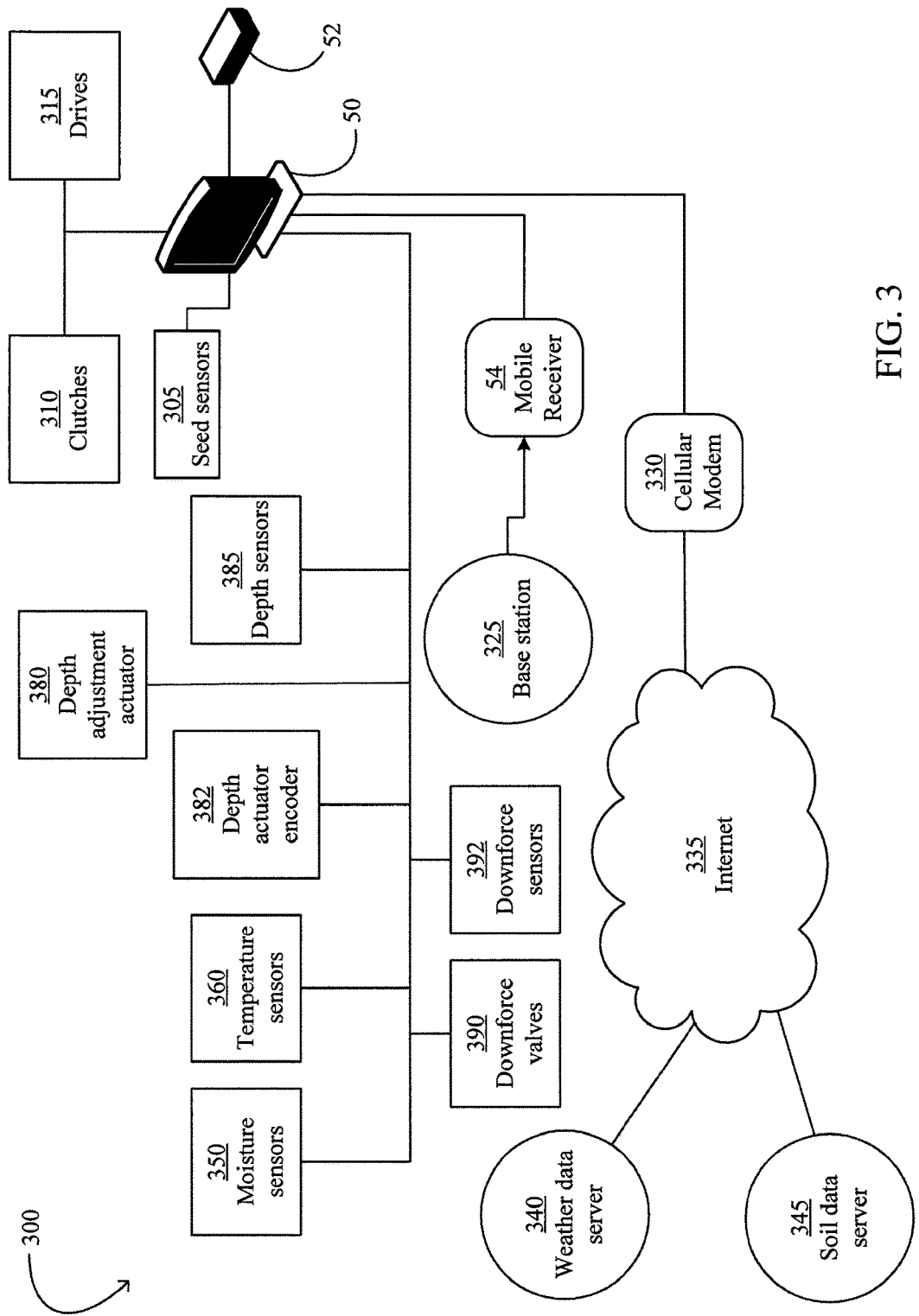
FIG. 3 schematically illustrates an embodiment of a soil monitoring and depth control system.

Turning to FIG. 3, a depth control and soil monitoring system 300 is schematically illustrated. The monitor 50 is preferably in electrical communication with components associated with each row unit 200 including the drives 315, the seed sensors 305, the GPS receiver 52, the downforce sensors 392, the valves 390, the depth adjustment actuator 380, the depth actuator encoders 382 (and in some embodiments an actual depth sensor 385 described later herein), and the solenoid valves 390. In some embodiments, particularly those in which each seed meter 230 is not driven by an individual drive 315, the monitor 50 is also preferably in electrical communication with clutches 310 configured to selectively operably couple the seed meter 230 to the drive 315.

Continuing to refer to FIG. 3, the monitor 50 is preferably in electrical communication with a cellular modem 330 or other component configured to place the monitor 50 in data communication with the Internet, indicated by reference numeral 335. Via the Internet connection, the monitor 50 preferably receives data from a weather data server 340 and a soil data server 345.

Figure 4A:
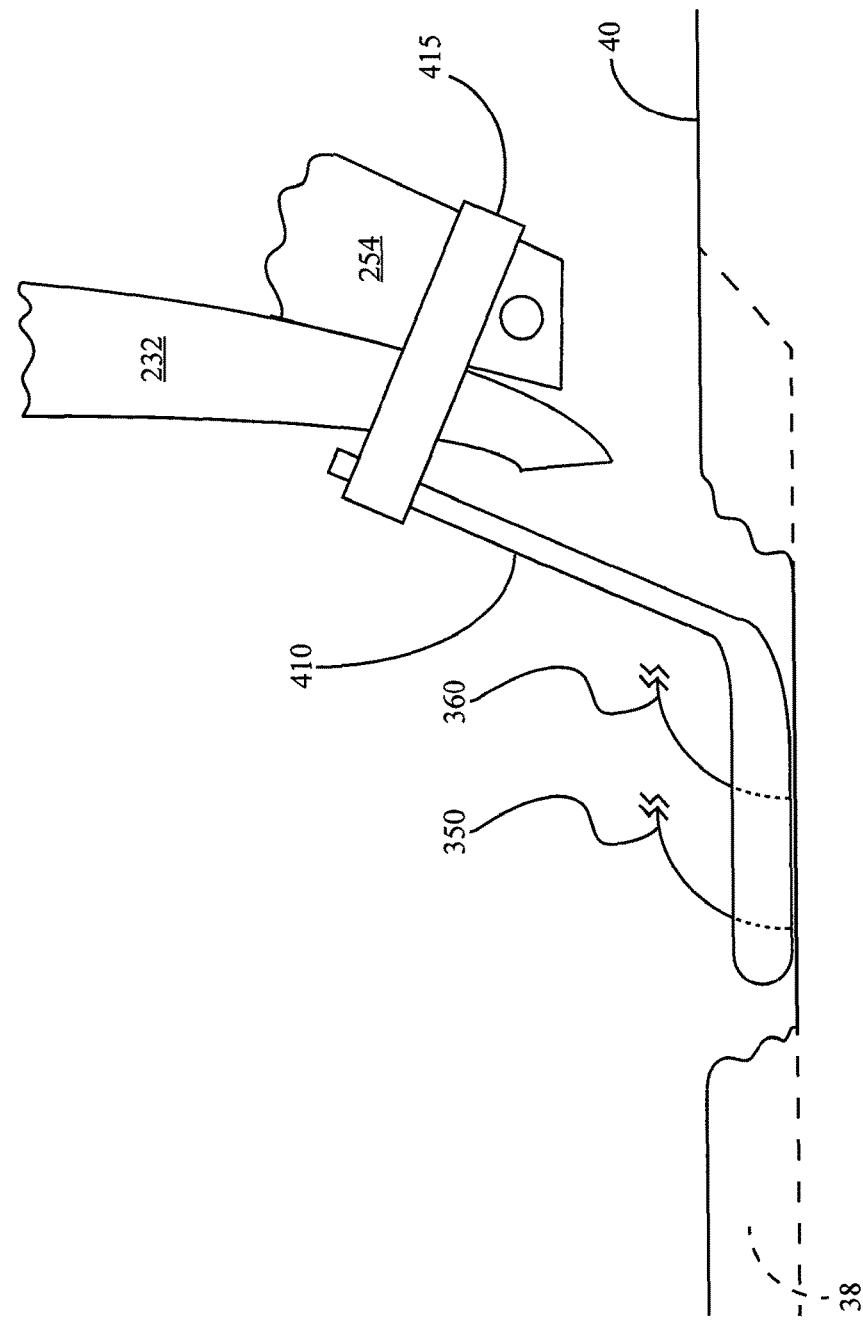
FIG. 4A is a side elevation view of an embodiment of a temperature sensor and an embodiment of a moisture sensor.
Figure 4B:
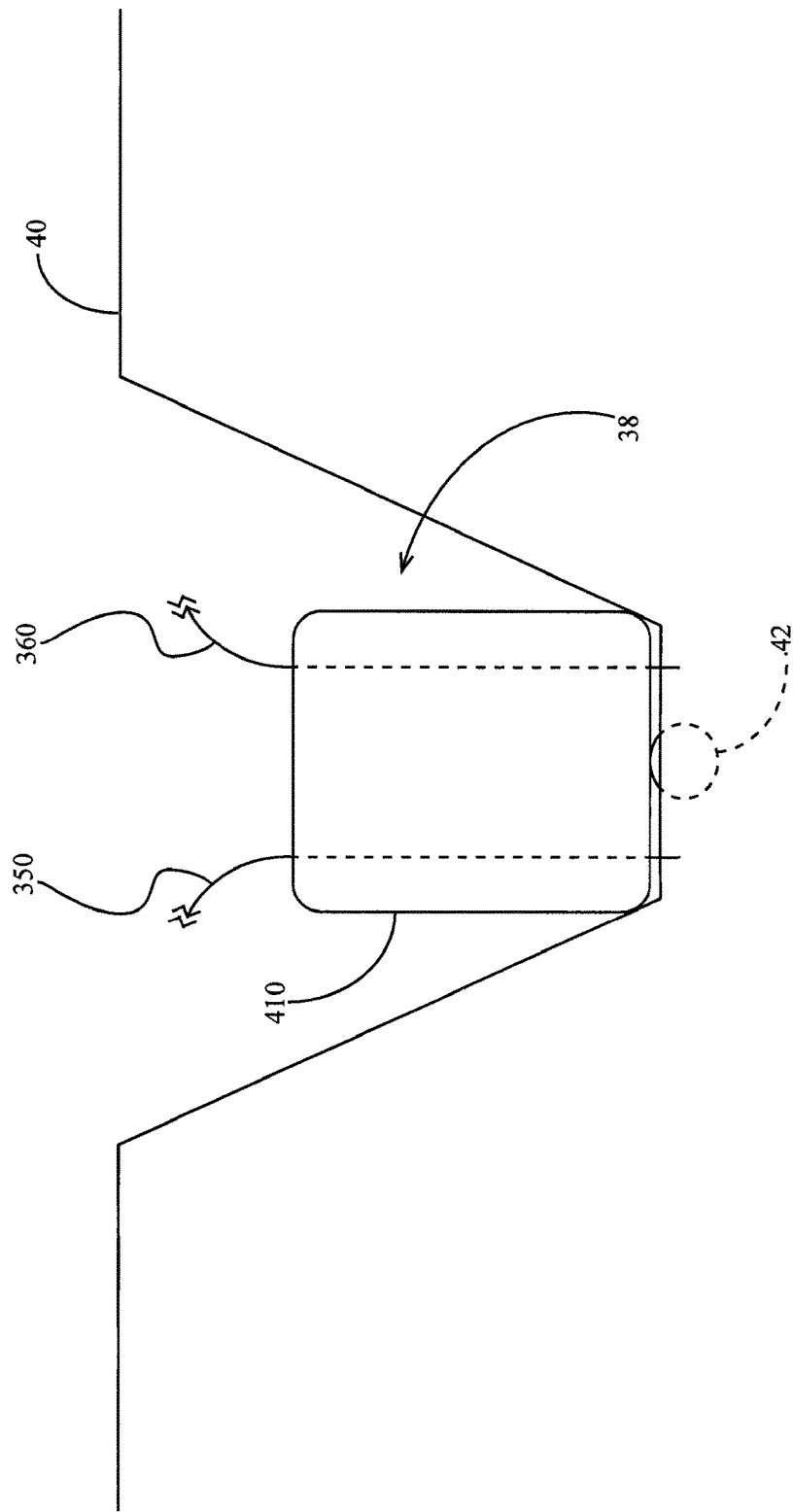
FIG. 4B is a rear elevation view of the temperature sensor and moisture sensor of FIG. 4A.
Figure 4C:
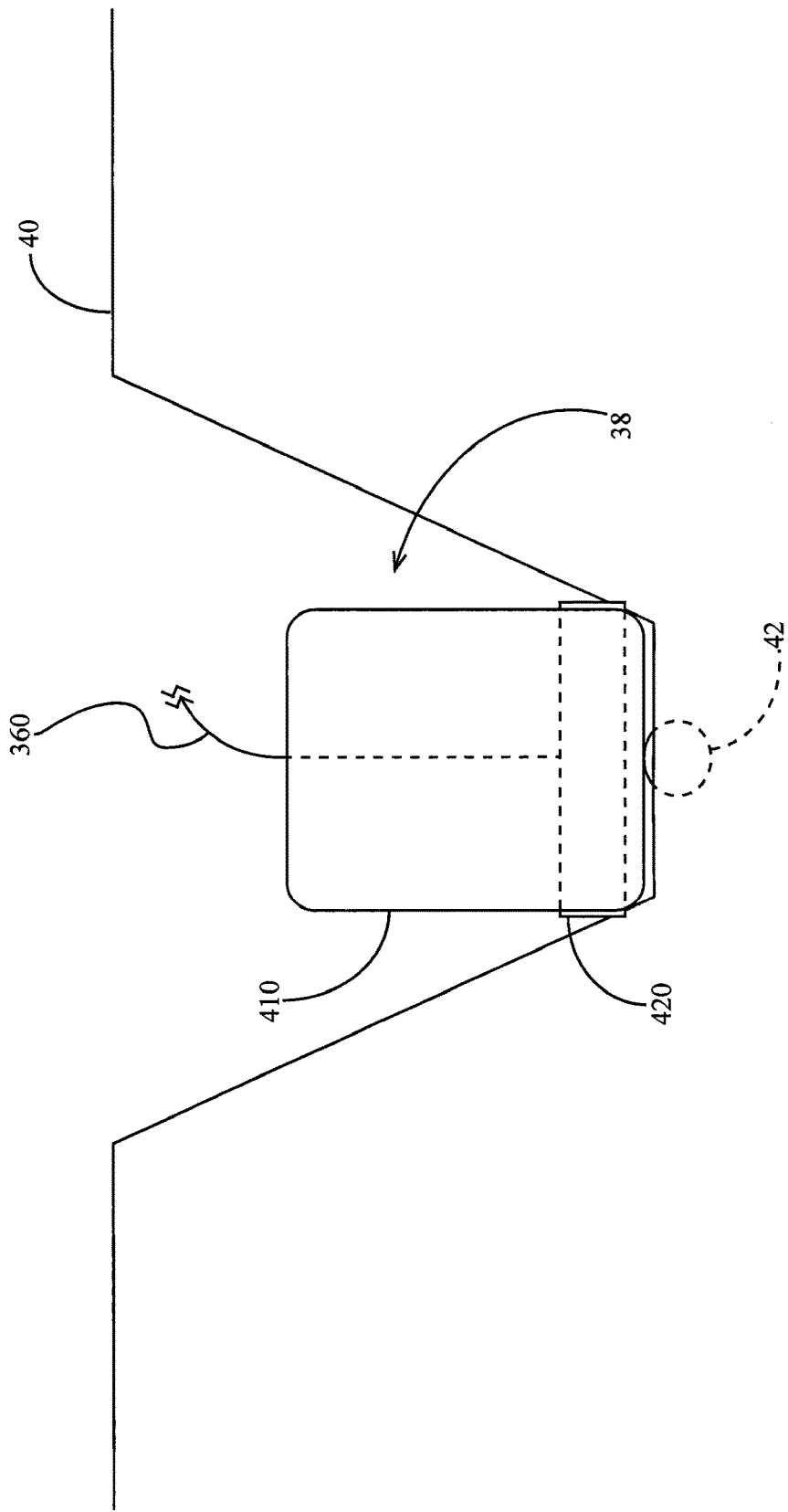
FIG. 4C is a rear elevation view of another embodiment of a temperature sensor.

Continuing to refer to FIG. 3, the monitor 50 is also preferably in electrical communication with one or more temperature sensors 360 mounted to the planter 10 and configured to generate a signal related to the temperature of soil being worked by the planter row units 200. In some embodiments one or more of the temperature sensors 360 comprise thermocouples disposed to engage the soil; in such embodiments the temperature sensors 360 preferably engage the soil at the bottom of the trench 38. One such embodiment is illustrated in FIG. 4A, in which a seed firmer 410 is illustrated mounted to the shank 254 by a bracket 415. As is known in the art, the seed firmer is preferably designed to resiliently engage the bottom of the trench 38 in order to press seeds 42 into the soil before the trench is closed. In the embodiment of FIG. 4A, the thermocouple is housed partially inside the firmer 410 and extends slightly from a bottom surface of the firmer in order to engage the soil such that the temperature sensor 360 generates a signal related to the temperature of the soil at the bottom of the trench 38. As illustrated in the rear elevation view of FIG. 4B, the temperature sensor 360 preferably extends from the firmer 410 at a transverse distance from the centerline of the firmer such that the temperature sensor does not contact seeds 42 passing beneath the bottom surface of the firmer. In another embodiment illustrated in FIG. 4C, the thermocouple is in contact with a soil-contacting component, e.g., a hollow copper tube 420 housed partially within the firmer 410 and extending therefrom to contact the soil near the bottom of the trench 38. In the illustrated embodiment, the tube 420 contacts the soil on both sides of the trench 38 such that the signal generated by the thermocouple is related to the temperature of the soil at the points of contact between the tube 420 and the soil. In other embodiments, one or more of the temperature sensors 360 may comprise a sensor disposed and configured to measure the temperature of the soil without contacting the soil as disclosed in International Patent Application No. PCT/US2012/035563, the disclosure of which is hereby incorporated herein in its entirety by reference.

Figure 10:
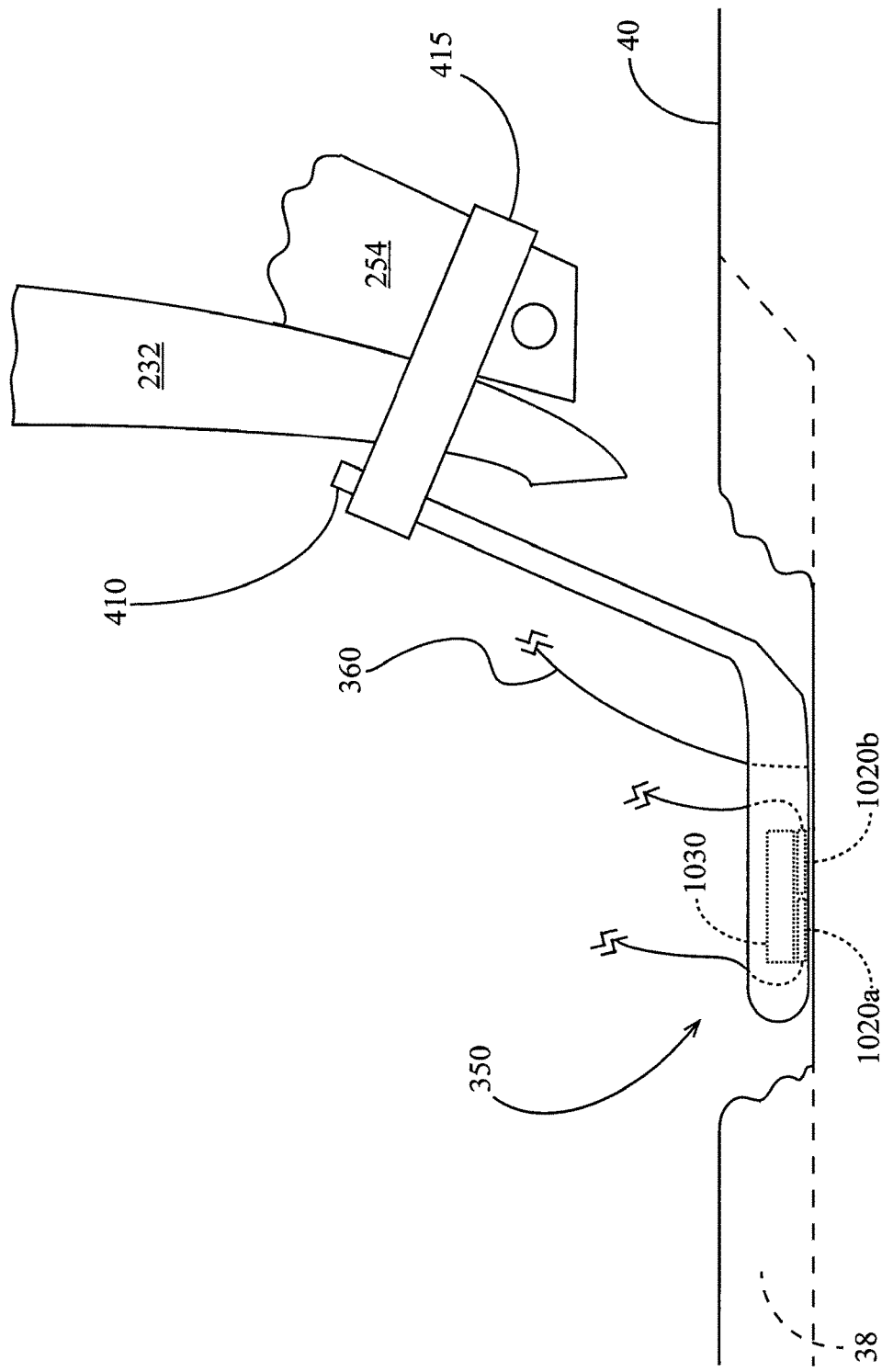
FIG. 10 is a side elevation view of another embodiment of a temperature sensor.

Referring to FIG. 3, the monitor 50 is preferably in electrical communication with one or more moisture sensors 350 mounted to the planter 10 and configured to generate a signal related to the temperature of soil being worked by the planter row units 200. In some embodiments one or more of the moisture sensors 350 comprise moisture probes (e.g., sensors configured to measure the electrical conductivity or dielectric permittivity) disposed to engage the soil; in such embodiments the temperature sensors 360 preferably engage the soil at the bottom of the trench 38. One such embodiment is illustrated in FIG. 4A, in which the moisture sensor 350 is housed partially inside the firmer 410 and extends slightly from a bottom surface of the firmer in order to engage the soil such that the moisture sensor 350 generates a signal related to the temperature of the soil at the bottom of the trench 38. As illustrated in the rear elevation view of FIG. 4B, the moisture sensor 350 preferably extends from the bottom of the firmer 410 at a transverse distance from the centerline of the firmer such that the moisture sensor does not contact seeds 42 passing beneath the bottom surface of the firmer. In another embodiment illustrated in FIG. 10, the moisture sensor 350 includes two co-planar capacitor plates 1020a and 1020b housed within the firmer 410 which pass adjacent to the bottom of the trench without displacing soil at the bottom of the trench. In some embodiments, the firmer 410 includes a region 1030 disposed above the capacitor plates 1020, the region 1030 having a low permittivity (e.g., in embodiments in which the region 1030 comprises an air cavity or a material having a low permittivity) or a high permittivity (e.g., in embodiments in which the region 1030 contains a material having high permittivity). In other embodiments, one or more of the moisture sensors 350 may comprise a sensor disposed and configured to measure the moisture content of the soil without contacting the soil, e.g., one or more infrared or near-infra-red sensors disposed to measure electromagnetic waves generated by one or more emitters (e.g., light-emitting diodes) and reflected from the soil surface (e.g., the bottom of the trench 38).

Figure 24:
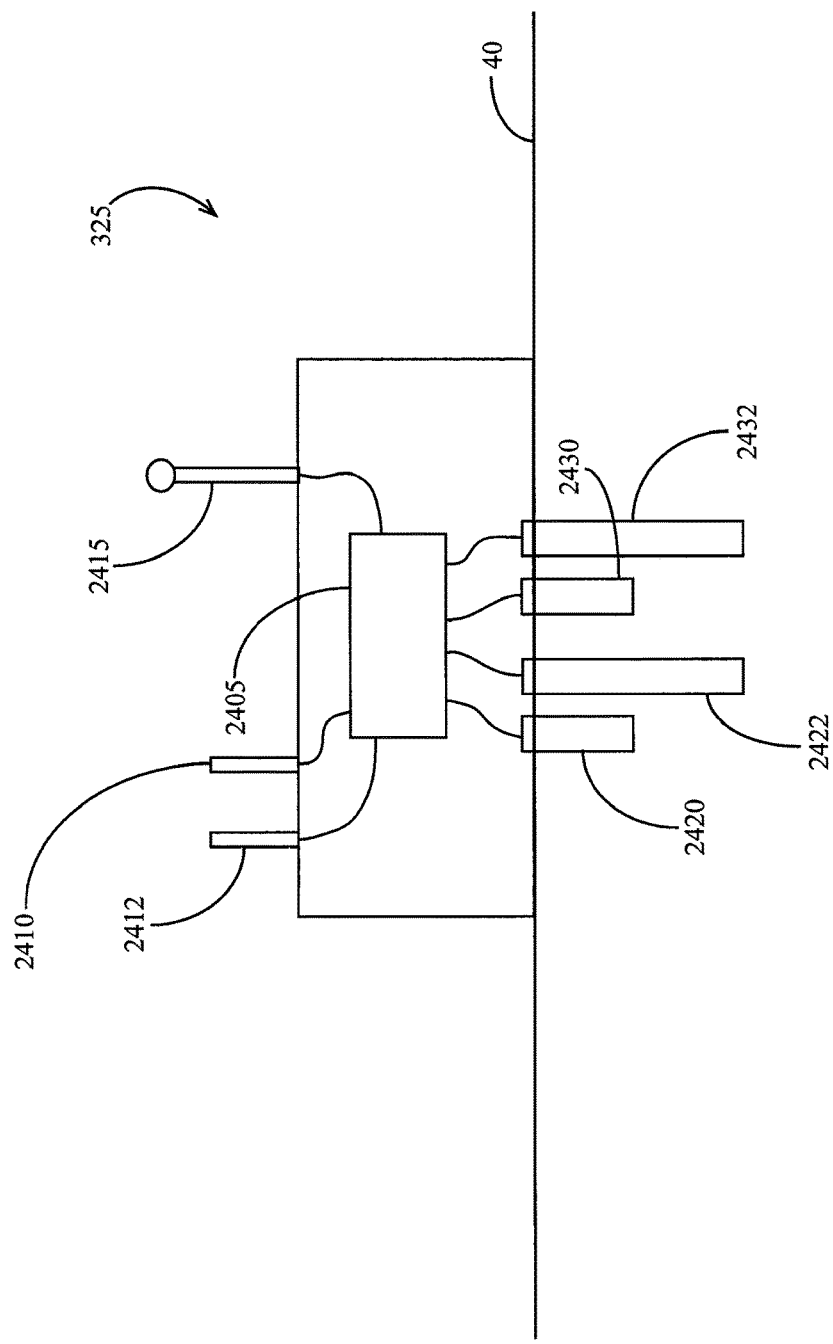
FIG. 24 is a side elevation view of an embodiment of a base station for monitoring and transmitting soil data and weather data.

Referring to FIG. 3, the monitor 50 is preferably in electrical communication with a mobile receiver 54 (e.g., a wireless data receiver) configured to receive data wirelessly (e.g., via a radio transmitter) from a base station 325 located in a field of interest. Turning to FIG. 24, the base station 325 preferably includes one or more temperature probes 2420, 2422 disposed at multiple depths in the soil in order to measure soil temperature at multiple depths. The base station 325 preferably includes one or more moisture probes 2430, 2432 disposed at multiple depths in the soil 40 in order to measure soil moisture at multiple depths. Each soil and moisture probe is preferably in electrical communication with a processor 2405. The processor 2405 is preferably in communication with a wireless transmitter 2415. The processor 2405 is preferably configured to convert signals to a format suitable for transmission via the wireless transmitter 2415 and to transmit the resulting formatted signals via the wireless transmitter. The base station 325 preferably includes a digital rain gauge 2410 (e.g., an optical, acoustic or weighing-type gauge) and a digital air temperature sensor 2412, both of which are preferably in electrical communication with the processor 2405.

Figure 25:
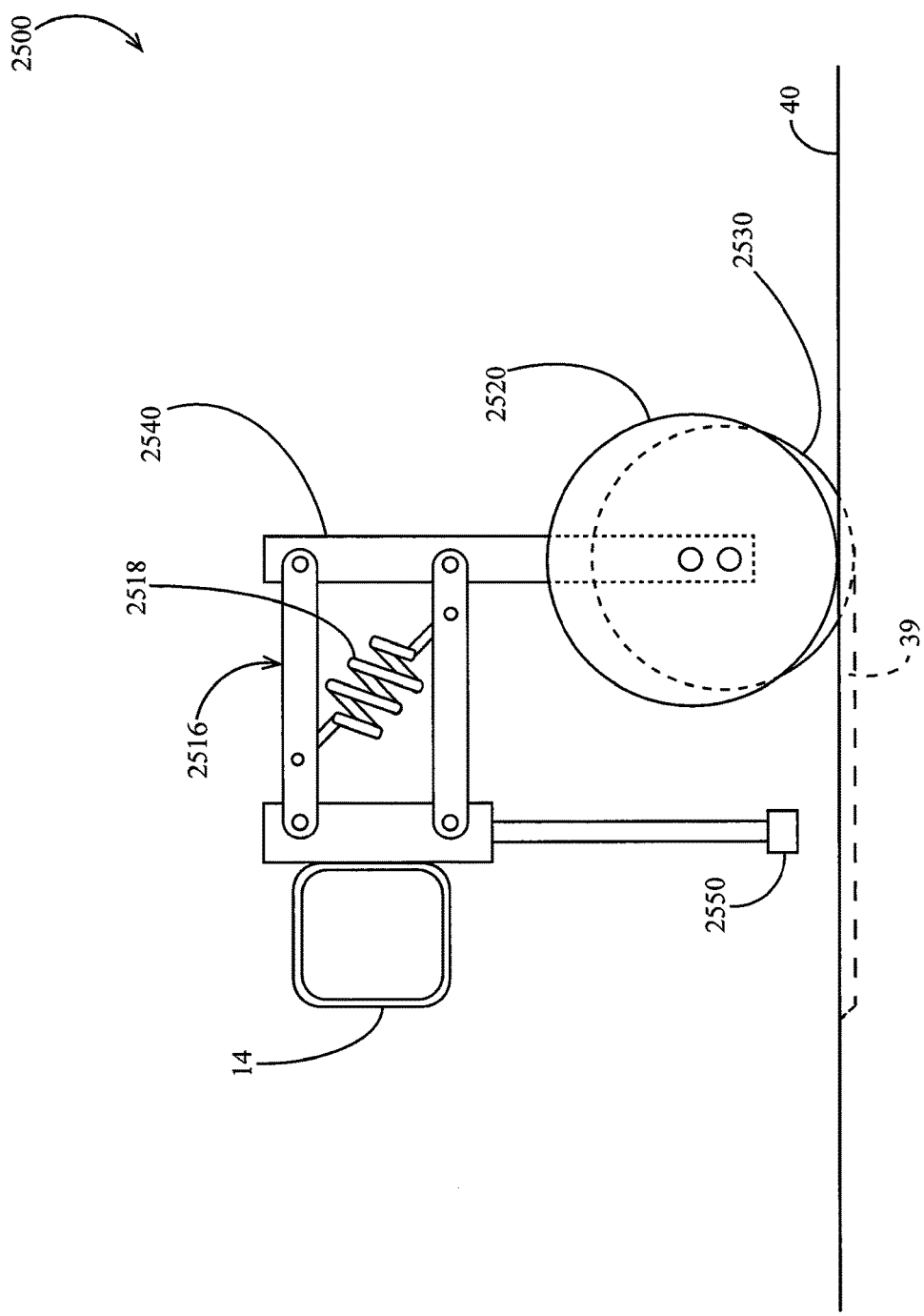
FIG. 25 is a side elevation of an embodiment of a measurement unit.

In some embodiments, a temperature and/or moisture measurement may be made by a measurement unit independent of the row units 200. An embodiment of a measurement unit 2500 is illustrated in FIG. 25. The measurement unit 2500 preferably includes a coulter 2530 disposed to open a trench 39 in the soil 40; in some embodiments the measurement unit instead includes two angled opening discs disposed to open a more v-shaped trench). The coulter 2530 is preferably rollingly mounted to a bracket 2540. The bracket 2540 preferably has sufficient weight to urge the coulter 2530 into the soil. A gauge wheel 2520 (or pair of gauge wheels) is preferably rollingly mounted to the bracket 2540 and disposed to ride along the surface of the soil, thus limiting the depth of the trench 39. The depth of the trench 39 is preferably set to a depth of interest; e.g., a default trench depth such as 1.75 inches. In some embodiments, the measuring unit 2500 incorporates a depth adjustment actuator in electrical communication with the monitor 50 and configured to modify the vertical distance between the mounting points of the coulter 2530 and the gauge wheel 2520 in order to adjust the trench depth. The bracket 2540 is preferably mounted to the toolbar 14 via a parallel arm arrangement 2526 such that the bracket is permitted to translate vertically with respect to the toolbar. A spring 2518 is preferably mounted to the parallel arm arrangement in order to urge the coulter 2530 into the soil 40. A temperature and/or moisture sensor 2550 is preferably mounted to the measurement unit 2500 (or in some embodiments the toolbar 14) and configured to measure temperature and/or moisture of soil in the trench 39. As in the illustrated embodiment, the sensor 2550 may comprise a sensor configured to measure temperature and/or moisture without contacting the soil such as an infrared sensor. In other embodiments, the sensor 2550 may incorporate sensors configured to engage the soil at the bottom of the trench 39 similar to those described herein, e.g., with respect to FIG. 4A.

Depth Adjustment Methods

Various methods disclosed herein in the section titled "Depth Control Methods" determine desired depths and/or desired depth adjustments. The actual adjustment of depth to the desired depth may be accomplished according to one of several methods as described in this section.

In a first method, the system 300 sends a command signal to the depth adjustment actuator 380 which corresponds to a desired depth or desired depth adjustment. The actuator 380 is preferably calibrated such that a set of depths and corresponding command signals are stored in the memory of the monitor 50.

In a second method, the system 300 sends a command signal to the depth adjustment actuator 380 in order to increase or decrease the trench depth until the desired depth or depth adjustment has been indicated by the depth actuator encoder 382.

Figure 26:
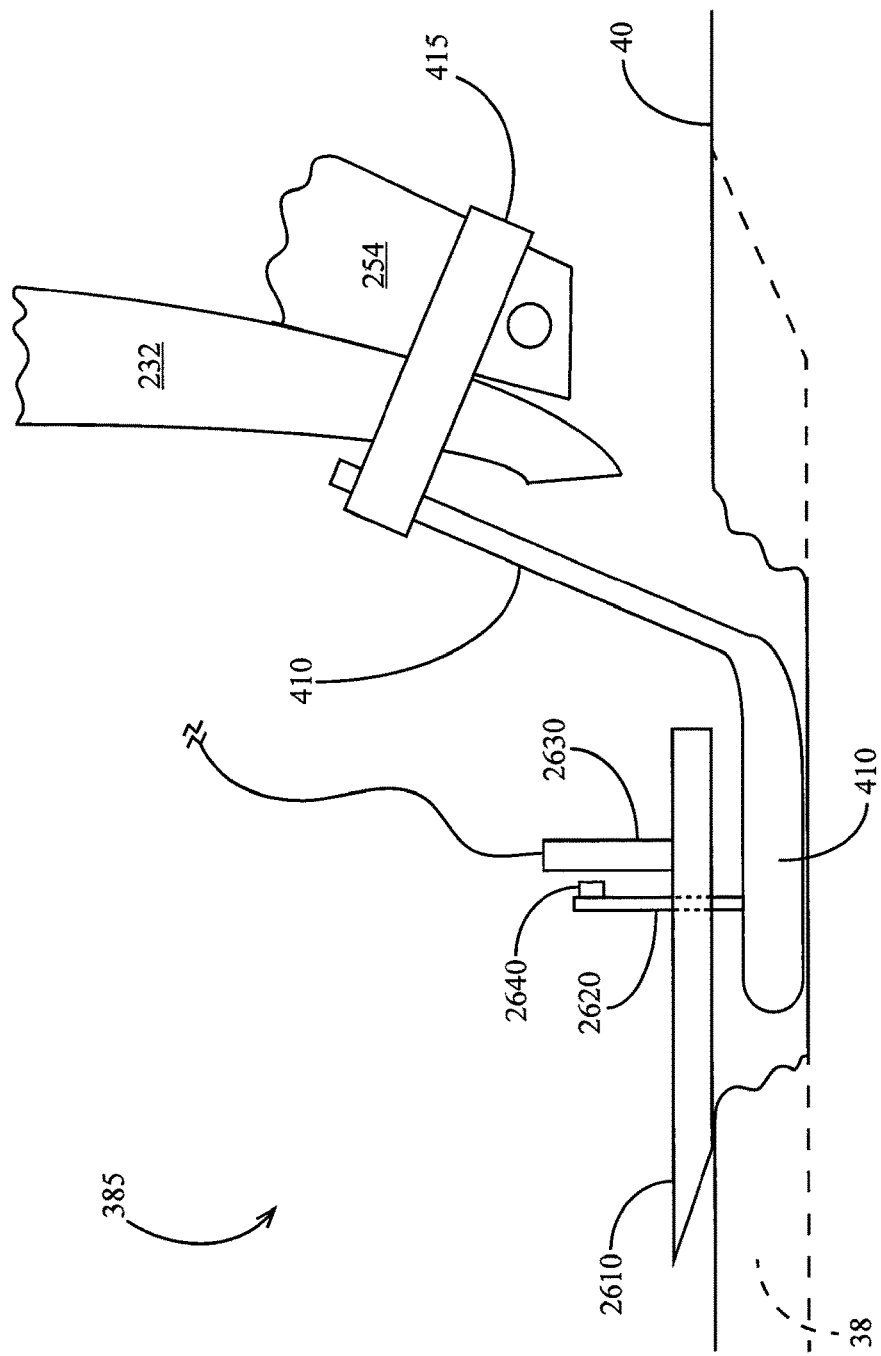
FIG. 26 is a side elevation view of an embodiment of a depth sensor.

In a third method, the system 300 sends a command signal to the depth adjustment actuator 380 in order to increase or decrease the trench depth until the desired depth or depth adjustment has been indicated by a depth sensor 385 configured to measure the actual depth of the trench. In some embodiments, the depth sensor 385 may comprise a sensor (or multiple sensors) disposed to measure a rotational position of the gauge wheel arms 260 relative to the row unit 200 as disclosed in Applicant's Provisional Patent Application No. 61/718,073, the disclosure of which is hereby incorporated herein in its entirety by reference. In other embodiments, the depth sensor 385 comprises a sensor disposed to directly measure the depth of the trench 38. One such embodiment is illustrated in FIG. 26, in which the depth sensor 385 includes a ski 2610 configured to ride along the surface of the soil to the side of the trench 38. In some embodiments, the ski 2610 includes two ground-engaging portions disposed to ride the surface of the soil on either side of the trench 38. An arm 2620 is preferably mounted to an upper surface of a portion of the firmer 410 which engages the trench 38. The arm 2620 preferably extends through an aperture in the ski 2610 such that the arm slides vertically relative to the ski as the firmer 410 deflects up and down. A magnet 2640 is preferably mounted to the arm 2620. A Hall-effect sensor 2630 is preferably mounted to the ski 2610. The Hall-effect sensor 2630 preferably comprises a circuit board including multiple Hall-effect sensors vertically spaced along a surface of the circuit board adjacent a plane defined by the range of motion of the magnet 2640. The Hall-effect sensor 2630 is preferably configured to generate a signal related to the position of the magnet 2640. The Hall-effect sensor 2630 is preferably in electrical communication with the monitor 50. The monitor 50 is preferably configured to determine the depth of the trench 38 based on the signal generated by the Hall-effect sensor 2630, for example, using an empirical lookup table.

Depth Control Methods

The system 300 preferably controls the depth of the trench 38 in which seeds are planted according to various processes based on one or more measurements or data inputs obtained by the system 300. It should be appreciated that the trench depth for an individual row unit 200 or group of row units may be controlled by measurements made by a sensor on the row unit or by a sensor on another row unit or remote from the row units 200 (e.g., on a measurement unit 2500 as described herein) or remote from the implement 10 (e.g., on a base station 325 as described herein). Likewise, the depth control methods described herein may be used to control the trench depth for a single row unit or a group of row units. Thus, for example, a single temperature measurement may be made at a single row unit 200 and used to determine a desired depth at multiple row units 200. Additionally, the moisture measurements used in the processes described herein may be obtained either from one of the moisture sensors described herein or using multiple temperature measurements at multiple depths, e.g., by generating a best-fit linear temperature-depth relationship and consulting a lookup table or empirically-developed equation correlating the slope of the temperature-depth relationship to soil moisture.

Figure 5:
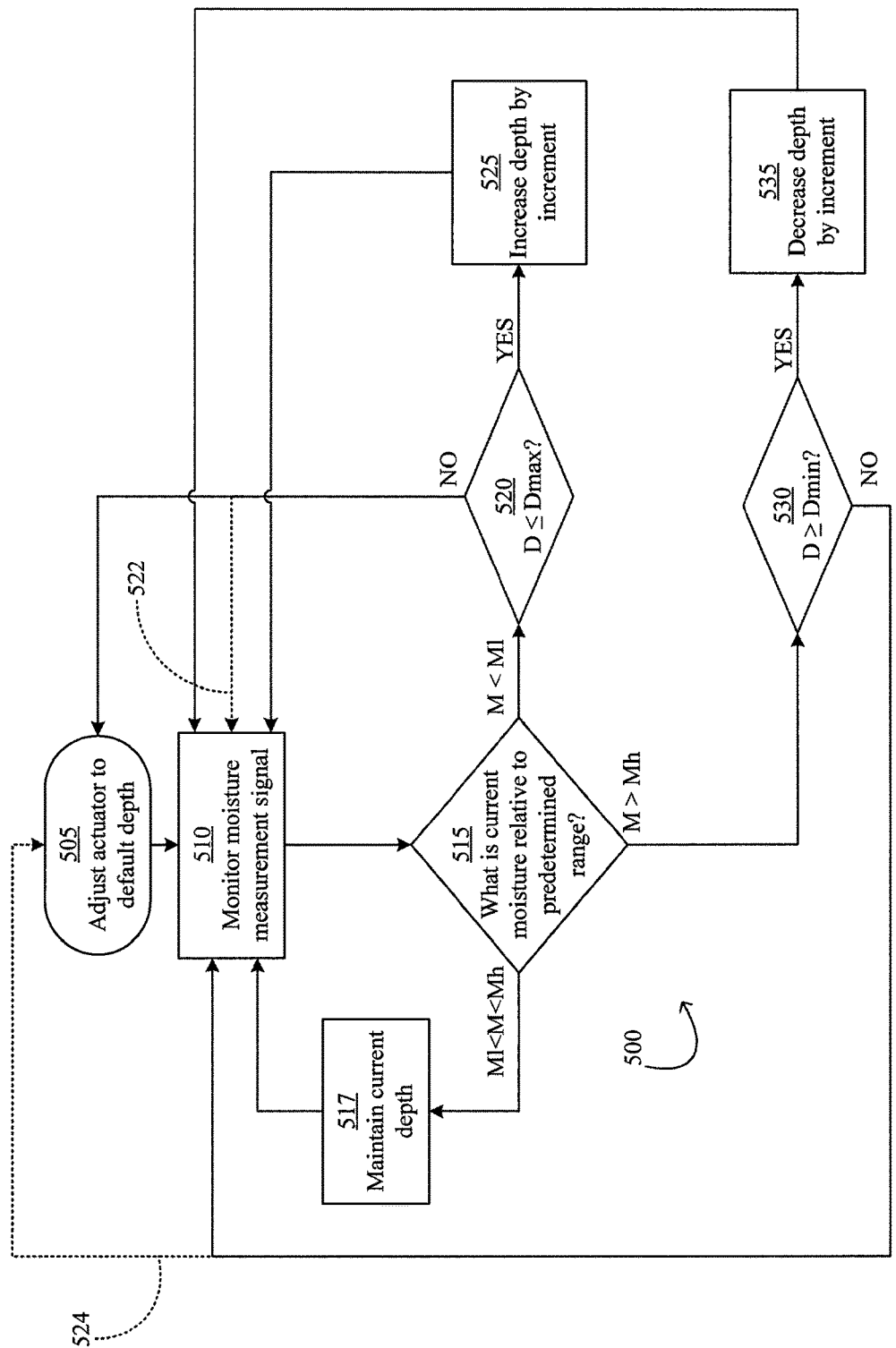
FIG. 5 illustrates an embodiment of a process for controlling trench depth based on soil moisture.

A process 500 for controlling trench depth based on soil moisture is illustrated in FIG. 5. At step 505, the system 300 preferably commands the depth adjustment actuator 380 to set the trench depth to a default depth Dd, e.g., 1.75 inches. At step 510, the system 300 preferably monitors the signal from a moisture sensor 350. At step 515, the system 300 preferably compares the measured moisture M to a predetermined range, preferably defined by a low moisture Ml (e.g., 15%) and an high moisture Mh (e.g., 35%). Moisture values are expressed herein as a volumetric percentage of water content; it should be appreciated that other units or measures of soil moisture as are known in the art may be substituted for these values. If the moisture M is less than Ml, then at step 520 the system 300 preferably determines whether the current depth D is less than or equal to a maximum depth Dmax (e.g., 2.25 inches); if it is, then at step 525 the system 300 preferably increases the depth D by an increment (e.g., 0.175 inches) and again monitors the soil moisture; if not, then at step 505 the system 300 preferably sets the depth D to the default depth. If at step 515 the moisture M is greater than Mh, then at step 530 the system 300 preferably determines whether the current depth D is greater than or equal to a minimum depth Dmin (e.g., 1.25 inches); if it is, then at step 535 the system 300 preferably decreases the depth D by an increment (e.g., 0.175 inches); if not, then at step 510 the system 300 preferably again monitors the moisture measurement signal. If at step 515 the current moisture M is between Ml and Mh, then at step 517 the system 300 preferably retains the current depth setting D and returns to monitoring the moisture measurement signal. In some embodiments of the method 500 reflected by alternate path 524, if M is greater than Mh and D is less than Dmin, the system adjusts the depth D to the default depth. In other embodiments of the method 500 reflected by alternate path 522, if M is less than Ml and D is greater than Dmax, then the system 300 returns to monitoring the moisture measurement signal without adjusting the depth D to the default depth.

Figure 6:
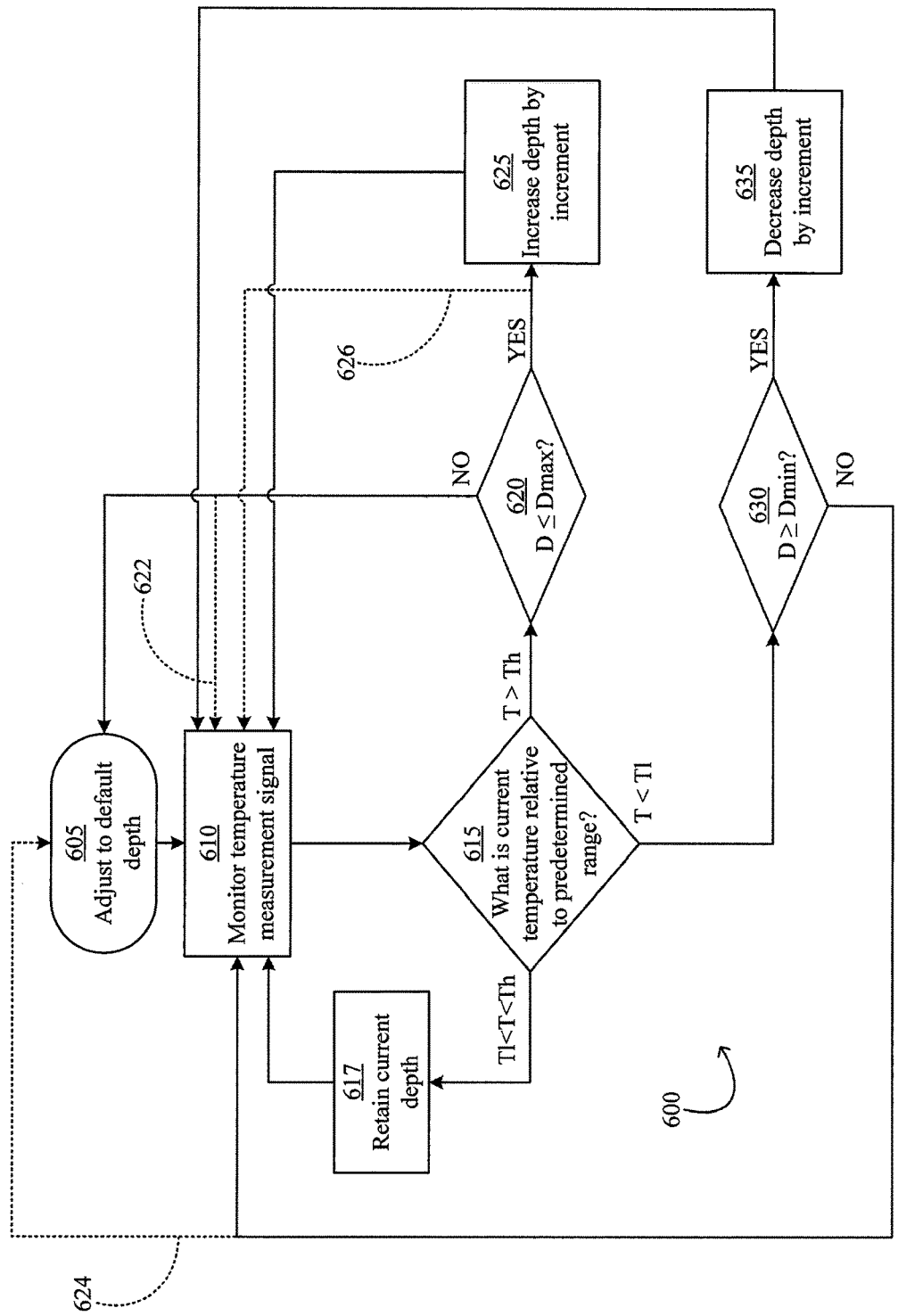
FIG. 6 illustrates an embodiment of a process for controlling trench depth based on soil temperature.

A process 600 for controlling trench depth based on soil temperature is illustrated in FIG. 6. At step 605, the system 300 preferably commands the depth adjustment actuator 380 to set the trench depth to a default depth, e.g., 1.75 inches. At step 610, the system 300 preferably monitors the signal from a temperature sensor 360. At step 615, the system 300 preferably compares the measured temperature T to a predetermined range, preferably defined by a low temperature Tl (e.g., 55 degrees Fahrenheit) and a high temperature Th (e.g., 65 degrees Fahrenheit). If the temperature T is greater than Th, then at step 620 the system 300 preferably determines whether the current depth D is less than or equal to a maximum depth Dmax (e.g., 2.25 inches); if it is, then at step 625 the system 300 preferably increases the depth D by an increment (e.g., 0.175 inches) and again monitors the soil temperature; if not, then at step 605 the system 300 preferably sets the depth D to the default depth. If at step 615 the temperature T is less than Tl, then at step 630 the system 300 preferably determines whether the current depth D is greater than or equal to a minimum depth Dmin (e.g., 1.25 inches); if it is, then at step 635 the system 300 preferably decreases the depth D by an increment (e.g., 0.175 inches); if not, then at step 610 the system 300 preferably again monitors the moisture measurement signal. If at step 615 the current temperature T is between Tl and Th, then at step 617 the system 300 preferably retains the current depth D and returns to monitoring the temperature measurement signal. In some embodiments of the process 600 reflected by alternate path 622, if T is greater than Th and D is greater than Dmax, the system 300 returns to monitoring the temperature measurement signal without adjusting the depth D to the default depth. In other embodiments of the process 600 reflected by alternate path 624, if T is less than Tl and D is less than Dmin, then the system 300 adjusts the depth D to the default depth before returning to monitoring the moisture measurement signal. In still other embodiments of the process 600 reflected by alternate path 626, if T is greater than Th and D is less than or equal to Dmax, then the system 300 returns to monitoring the temperature measurement signal without adjusting the depth D to the default depth.

In other embodiments of the process 600, a stationary probe or on-planter temperature probe is configured and disposed to determine the soil temperature at a constant depth (e.g., 4 inches) Dc greater than or equal to Dmax. The system preferably compares the measured temperature at depth D to the measured temperature at Dc and determines a distribution of temperatures between D and Dc. The desired depth is then selected corresponding to a desired temperature within the distribution.

Figure 7:
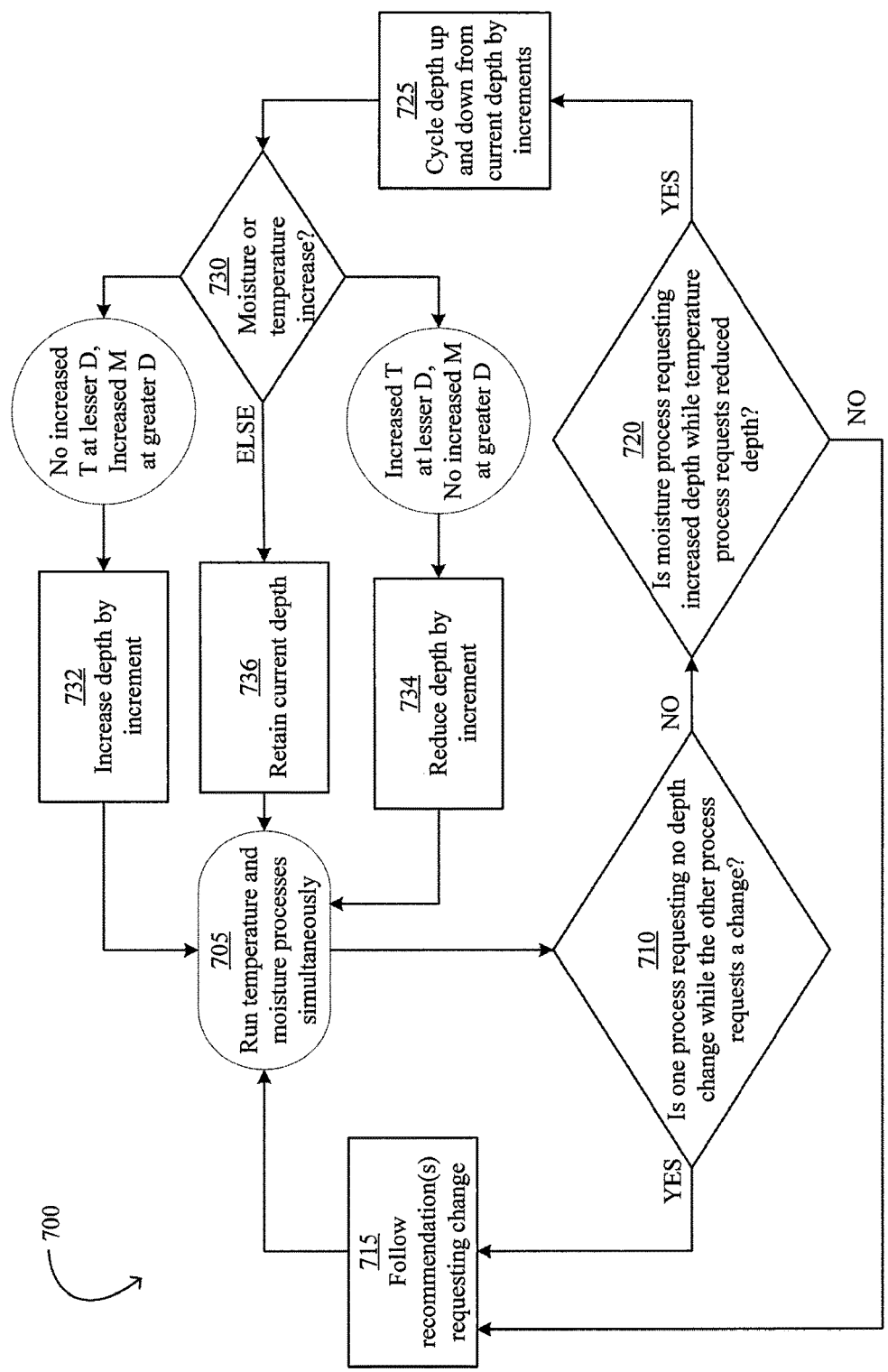
FIG. 7 illustrates an embodiment of a process for controlling trench depth based on soil temperature and soil moisture.

A process 700 for controlling depth based on soil moisture and soil temperature is illustrated in FIG. 7. At step 705, the system 300 preferably runs the process 500 and the process 600 simultaneously. The term "simultaneously" as used herein means that the processes generally run at the same time and does not require that any particular corresponding step in each process be carried out at or near the same time; however, in a preferred embodiment, after each cycle of the processes 500, 600 (the term "cycle" meaning, e.g., a sequence resulting in a depth change recommendation even if the recommendation is to retain the current depth) is completed, each process (e.g., process 500) preferably waits for the current cycle of the other process (e.g., process 600) to complete before moving on to step 710. Once both processes 500, 600 have generated a depth recommendation, at step 710 the system 300 preferably determines whether one process is recommending a depth change while the other process is recommending a depth change; if so, at step 715 the system 300 preferably follows the recommendation requesting a depth change. If not, then at step 720 the system 300 preferably determines whether the moisture process 500 is recommending increased depth while the temperature process 600 is requesting reduced depth; if not, then at step 715 the system 300 preferably follows the recommendation requesting a depth change; if so, then at step 725 the system 300 preferably adjusts the trench depth up and down by increments relative to the current depth setting (e.g., by 0.175 inches deeper and shallower than the current depth setting) in order to determine whether a threshold increase in moisture or temperature is obtained at depths above and below the current depth setting; after cycling up and down at step 725, the system 300 preferably returns to the current depth setting. At step 730, the system 300 preferably determines whether temperature or moisture increases at the increased or reduced depths sampled at step 725. If temperature does not increase by at least a threshold (e.g., 2 degrees Fahrenheit) at decreased depth but moisture increases by at least a threshold (e.g., 2%) at increased depth, then at step 732 the system 300 preferably increases the depth by the increment recommended by the moisture process 500. If temperature increases by at least a threshold (e.g., 2 degrees Fahrenheit) at decreased depth but moisture does not increase by at least a threshold (e.g., 2%) at increased depth, then at step 734 the system 300 preferably reduces the depth by the increment recommended by the temperature process 600. In all other cases, at step 736 the system 300 preferably retains the current depth setting.

Figure 8:
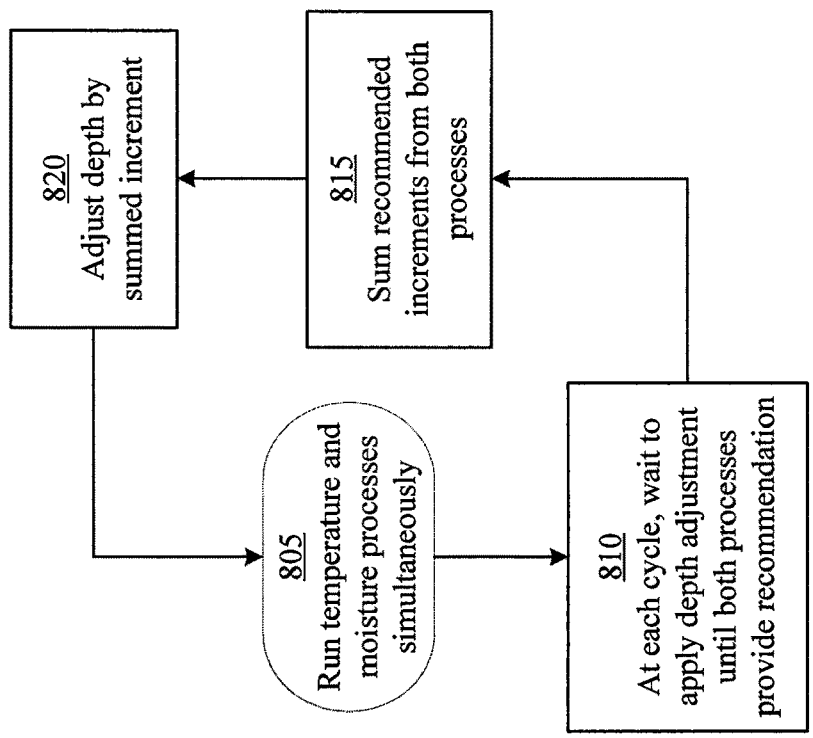
FIG. 8 illustrates another embodiment of a process for controlling trench depth based on soil temperature and soil moisture.

Another process 800 for controlling depth based on soil temperature and soil moisture is illustrated in FIG. 8. At step

805, the system preferably runs the process 500 and the process 600 simultaneously. At step 810, after each cycle of the processes 500, 600, the system 300 preferably waits until both processes have supplied a depth recommendation. At step 815, the system 300 preferably sums the recommended depth adjustment increments recommended by both processes 500, 600; it should be appreciated that if either of the processes 500, 600 recommend retaining the current depth, then that process contributes zero to the summed increment. At step 820, the system 300 preferably adjusts the depth setting by the summed increment.

Figure 9:
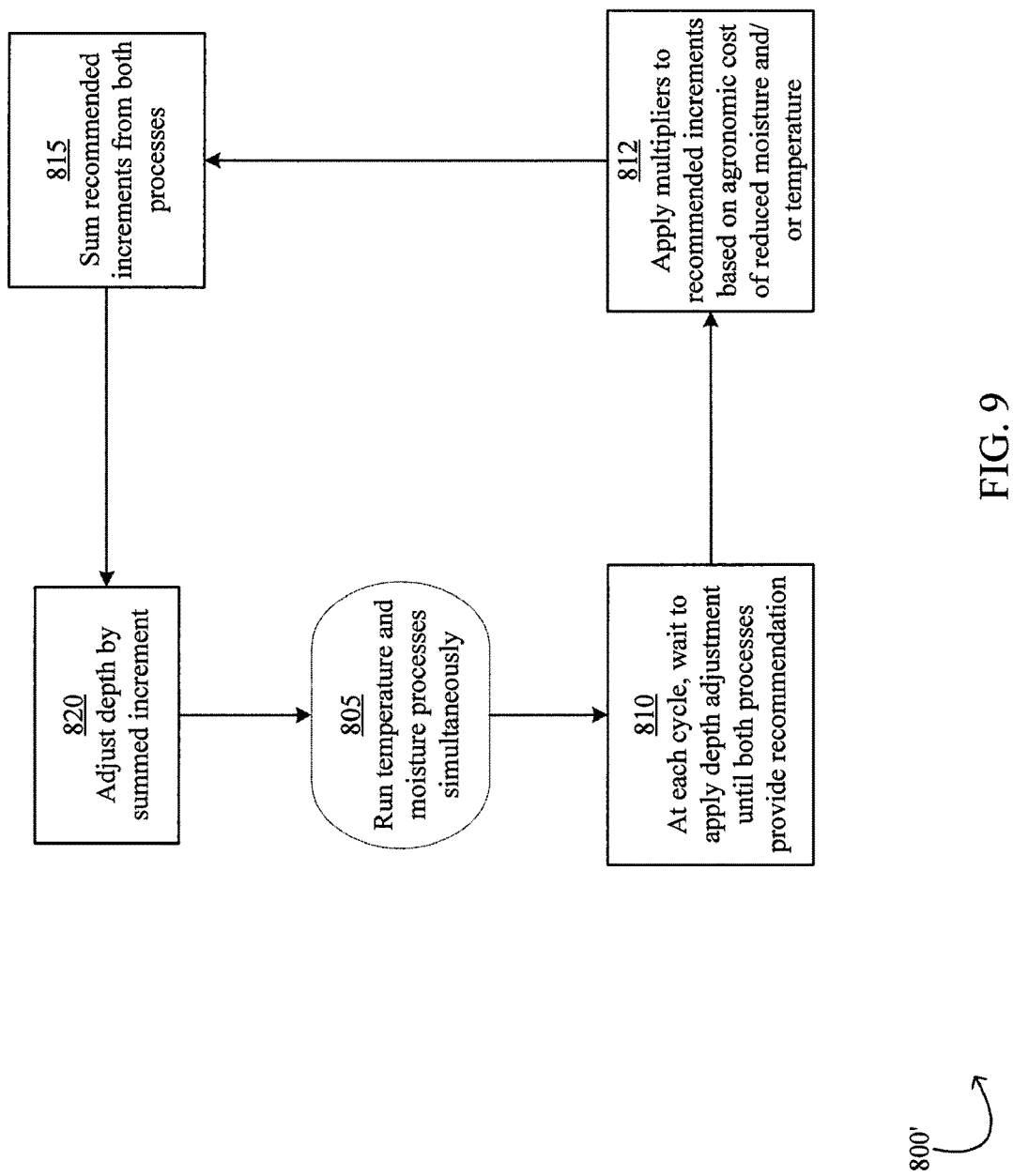
FIG. 9 illustrates still another embodiment of a process for controlling trench depth based on soil temperature and soil moisture.

A modified process 800' for controlling depth based on soil temperature and soil moisture is illustrated in FIG. 9. The modified process 800' is similar to the process 800, but at step 812 multipliers are preferably applied to each of the incremental depth adjustments recommended by the processes 500, 600. In some embodiments, the multipliers may be based on the relative agronomic cost associated with lost moisture and/or temperature; for example, assuming a greater agronomic cost is associated with lost moisture than with lost temperature, the multipliers may be 0.9 for the temperature recommendation and 1.1 for the moisture recommendation. It should be appreciated that multipliers may be applied to the input values rather than the resulting recommendations of processes 500, 600; for example, a multiplier of 0.9 per degree Fahrenheit may be applied to the temperature measurement and a multiplier of 1.1 per 1% moisture content may be applied to the moisture measurement.

Figure 11:
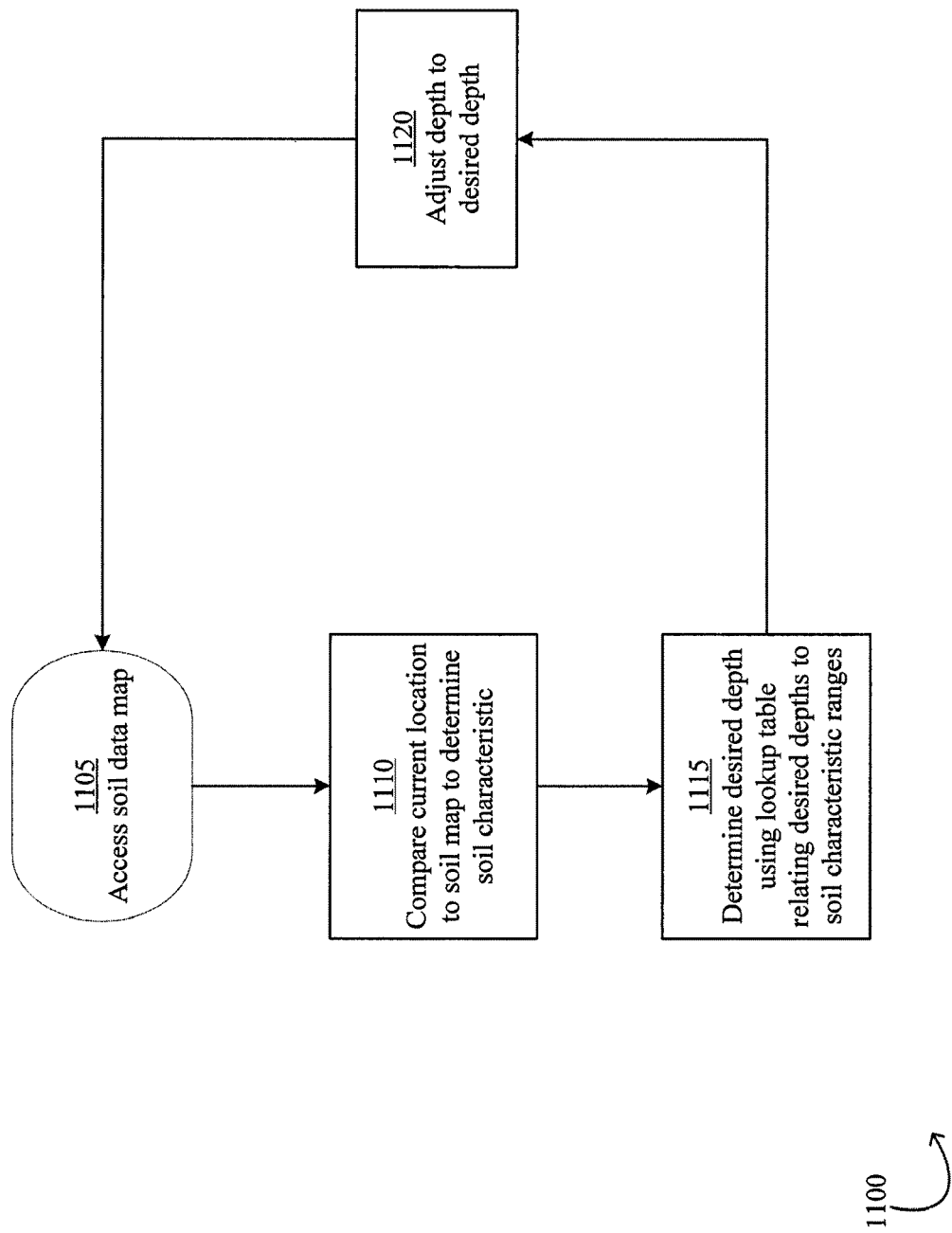
FIG. 11 illustrates an embodiment of a process for controlling trench depth based on soil data.

A process 1100 for controlling depth based on soil data is illustrated in FIG. 11. At step 1105, the system 300 preferably accesses soil data (e.g., a geo-referenced soil data map such as a shape file associating soil data with geo-referenced positions); the monitor 50 may obtain the soil data from the soil data server 345, although in some embodiments the soil data may be stored in the memory of the monitor 50. At step 1110, the system 300 preferably compares a current location of the planter 10 (e.g., as reported by the GPS receiver 52) to the geo-referenced soil data in order to determine a soil characteristic (e.g., soil type) of the soil at the current location. At step 1115, the system 300 preferably determines a desired depth based on the retrieved soil data, e.g., using a lookup table relating desired depths to soil characteristic ranges. In one illustrative example, the lookup table may include a set of soil types, each associated with a desired depth; e.g., Ipava soil may be associated with a desired depth of 1.75 inches while Sable soil may be associated with a desired depth of 1.8 inches. In other embodiments, at step 1115 the system 300 uses a formula to calculate a desired depth Dd based on the soil data, e.g., using the equation:

$$D_d = 1.75 + 0.007 \times (C - 10)$$

Where: C is the clay content of the soil, expressed as a percentage.

At step 1120 the system 300 preferably adjusts the trench depth to the desired depth.

Figure 12:
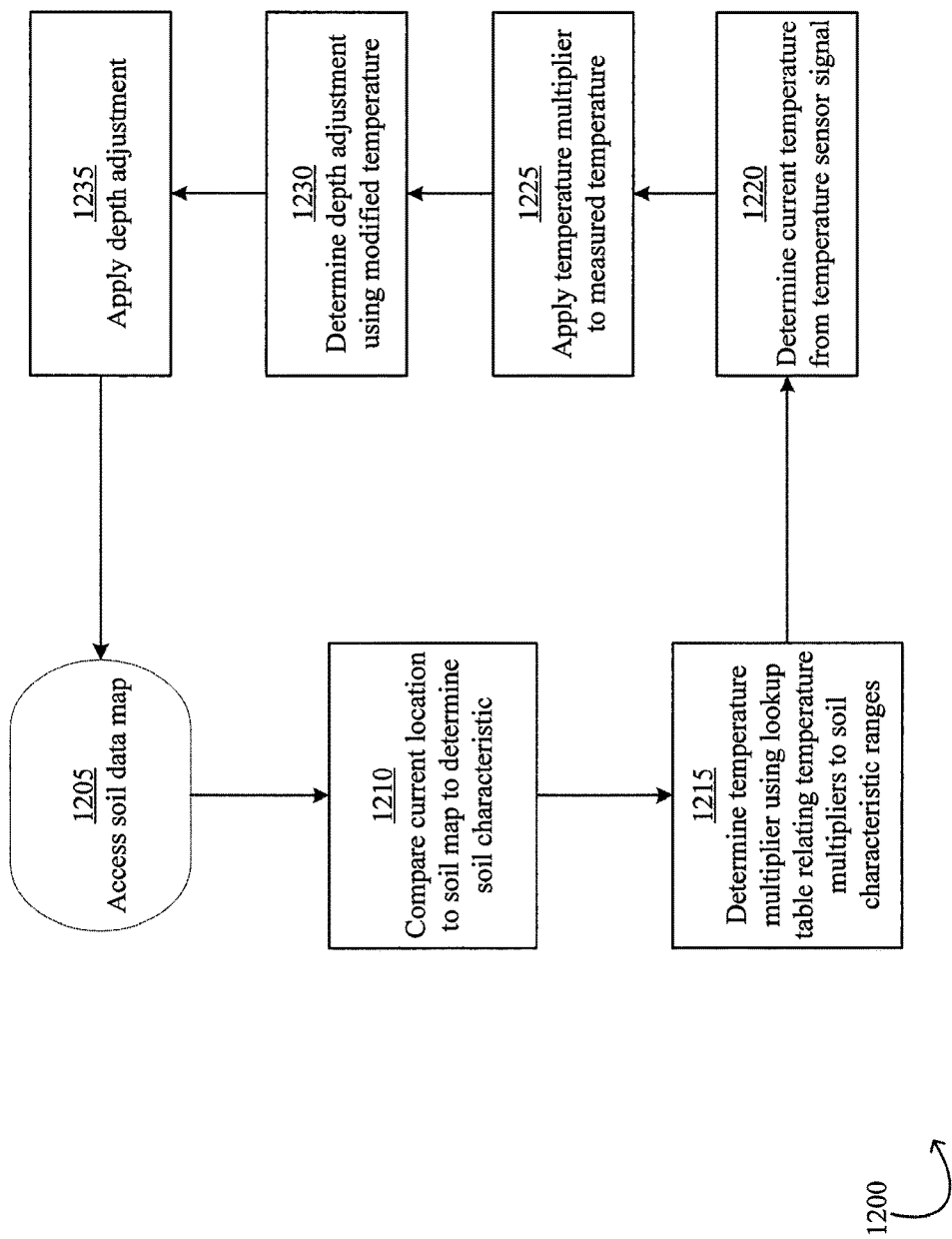
FIG. 12 illustrates an embodiment of a process for controlling trench depth based on soil data and soil temperature.

A process 1200 for controlling depth based on soil data and soil temperature is illustrated in FIG. 12. At step 1205, the system 300 preferably accesses soil data as described above with respect to step 1105 of process 1100. At step 1210, the system 300 preferably determines a soil characteristic by comparing the current location to the geo-referenced soil data as described above with respect to step 1110 of process 1100. At step 1215, the system 300 preferably determines a temperature multiplier using a lookup table or equation relating temperature multipliers to soil characteristic ranges; e.g., a multiplier of 1.1 may be associated with Ipava soil while a multiplier of 0.9 may be associated with Sable soil. At step 1220, the system 300 preferably determines the current temperature from the temperature sensor signal. At step 1225, the system 300 preferably applies the temperature multiplier to the measured temperature. At step 1230, the system 300 preferably determines a recommended depth adjustment using the modified (multiplier-applied) temperature, e.g., using the process 600 described herein. At step 1235, the system 300 preferably applies the recommended depth adjustment. It should be appreciated that the process 1200 could be modified in order to control depth based on soil type and other measured soil characteristics such as soil moisture. In some embodiments, the monitor 50 consults a lookup table to determine values of Mh and Ml for the soil type corresponding to the current position of the row unit; e.g., the values of Mh, Ml may be 30%, 15% respectively for silt loam and 36%, 20% respectively for sandy clay loam.

Figure 13:
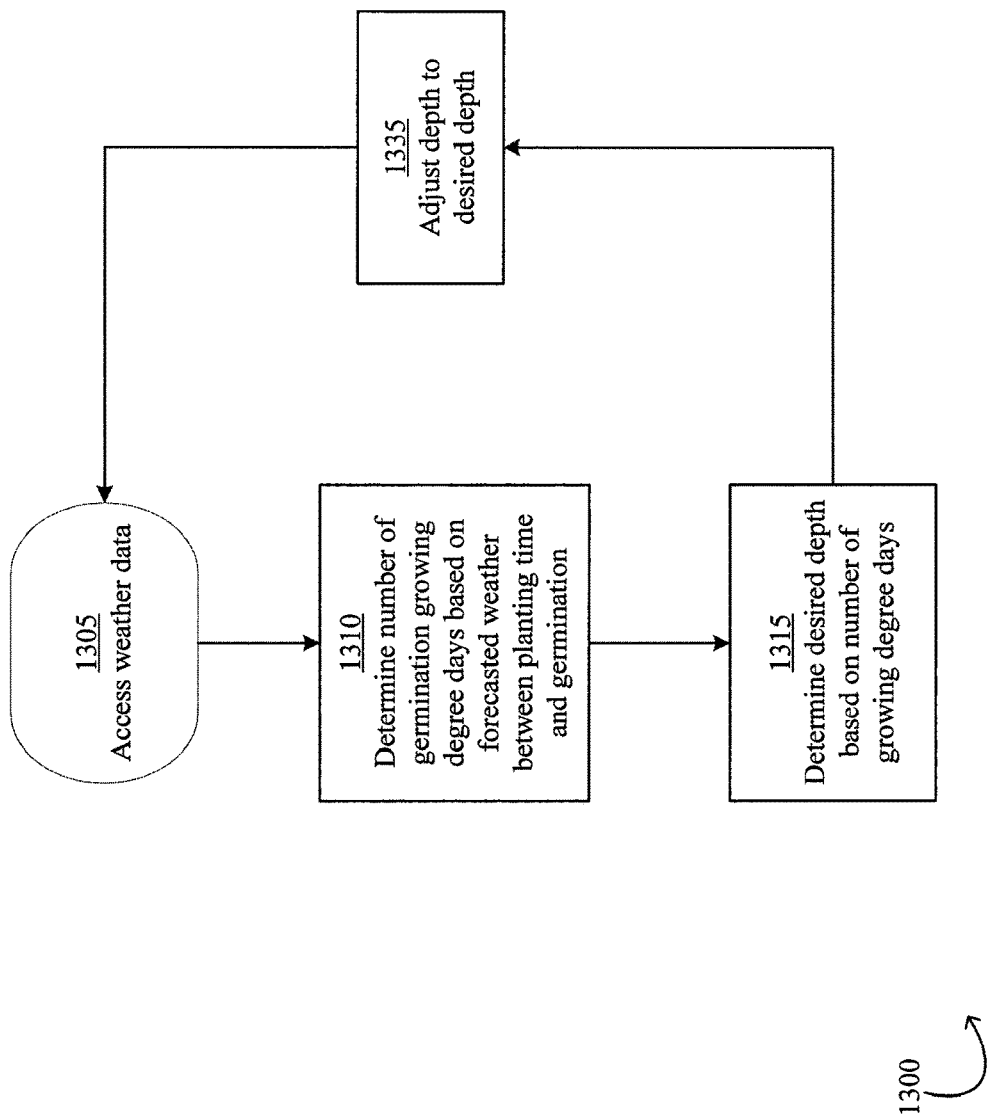
FIG. 13 illustrates an embodiment of a process for controlling trench depth based on weather data.

A process 1300 for controlling depth based on weather data is illustrated in FIG. 13. At step 1305, the system 300 preferably accesses weather data, e.g. from the weather data server 340. The system 300 then determines a desired depth based on the weather data, which may include, inter alia, predicted precipitation, predicted air temperature, past precipitation, or past air temperature. In the illustrated example, at step 1310 the system 300 obtains the predicted air temperature and determines the number of growing degree days G between the time of planting and the time of germination, e.g., using the equation below in which preferred values are specified for corn:

$$G = \sum_{n=1}^{N} \left( \frac{T_{max} + T_{min}}{2} - Tbase \right)$$

Where:
N is the number of days between planting to germination, e.g. 5;
Tmax is the maximum predicted temperature in Fahrenheit during each successive 24-hour period following the time of planting;
Tmin is the minimum predicted temperature in Fahrenheit during each successive 24-hour period following the time of planting, or Tbase if the minimum predicted temperature is less than Tbase; and
Tbase is the base temperature for the seed, e.g., 50 degrees Fahrenheit.

Once the number of predicted growing degree days is determined, at step 1315 the system 300 preferably determines a desired depth based on the number of predicted growing days. In some embodiments, the system 300 consults a lookup table stored in the memory of the monitor 50; for example, a depth of 1.75 inches may be desired for growing degree days greater than 30, a depth of 1.5 inches may be desired for growing degree days between 15 and 30, and a depth of 1.25 inches may be desired for growing degree days between 0 and 15 degrees. It should be appreciated that a shallower depth is generally desired for lesser growing degree day values. At step 1335, the system 300 preferably adjusts the trench depth to the desired depth determined at step 1315.

Figure 14:
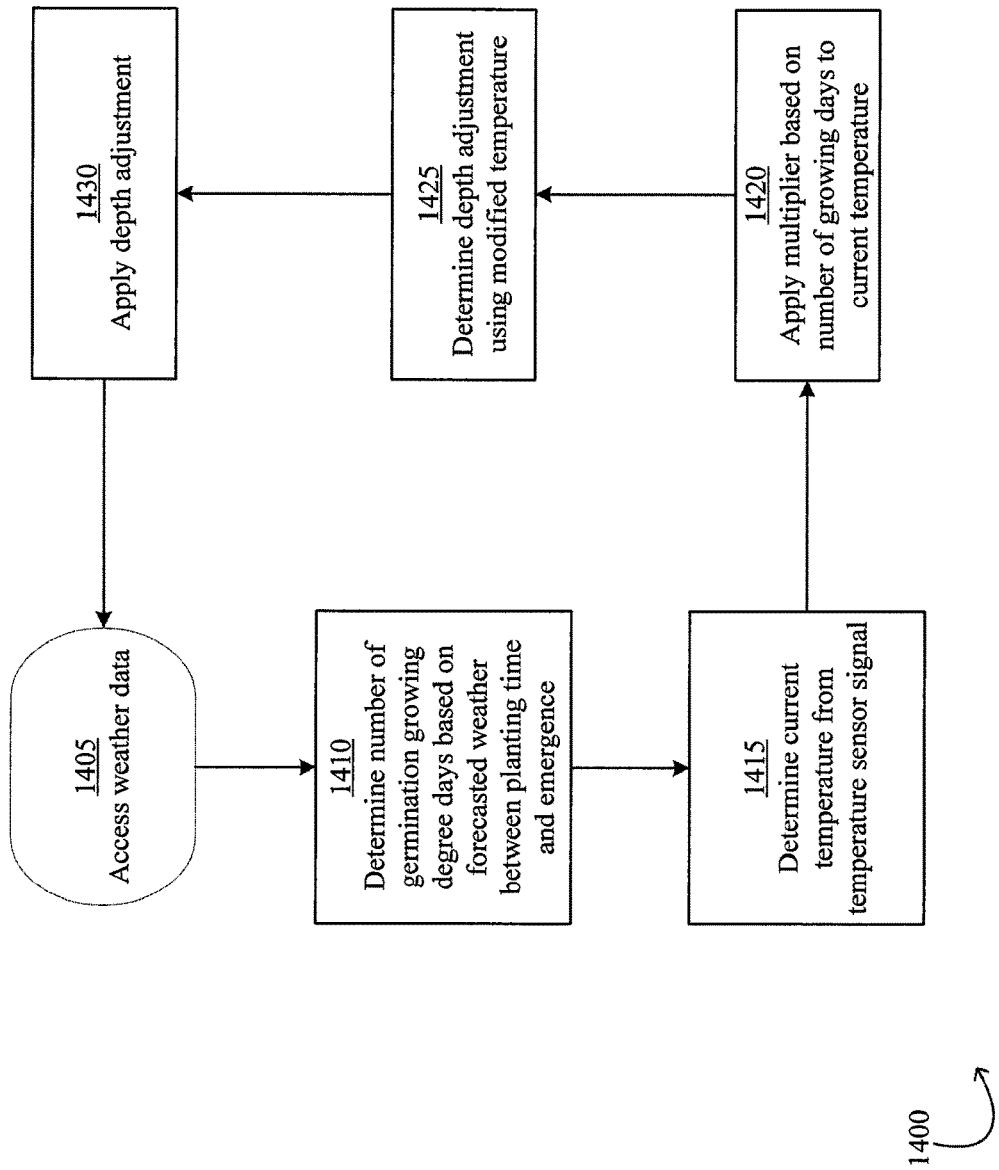
FIG. 14 illustrates an embodiment of a process for controlling trench depth based on weather data and soil temperature.

A process 1400 for controlling depth based on weather data and soil temperature is illustrated in FIG. 14. At step 1405, the system 300 preferably accesses weather data as described above with respect to process 1300. At step 1410, the system 300 preferably determines a number of growing degree days as described above with respect to process 1300. At step 1415, the system 300 preferably determines the current temperature based on the signal received from the temperature sensor 360. At step 1420, the system 300 preferably applies a multiplier to the measured temperature; the multiplier is preferably based on the number of growing degree days calculated at step 1410. For example, a multiplier of 1 may be applied for growing degree days greater than 15 and a multiplier of 0.8 may be applied for growing degree days less than 15; it should be appreciated that resulting modified soil temperature is preferably smaller for smaller growing degree day values. At step 1425, the system 300 preferably determines a recommended depth adjustment based on the modified (multiplier-applied) temperature, e.g., using the process 600 described herein. At step 1430, the system 300 preferably adjusts the trench depth according to the adjustment determined at step 1425.

Figure 15:
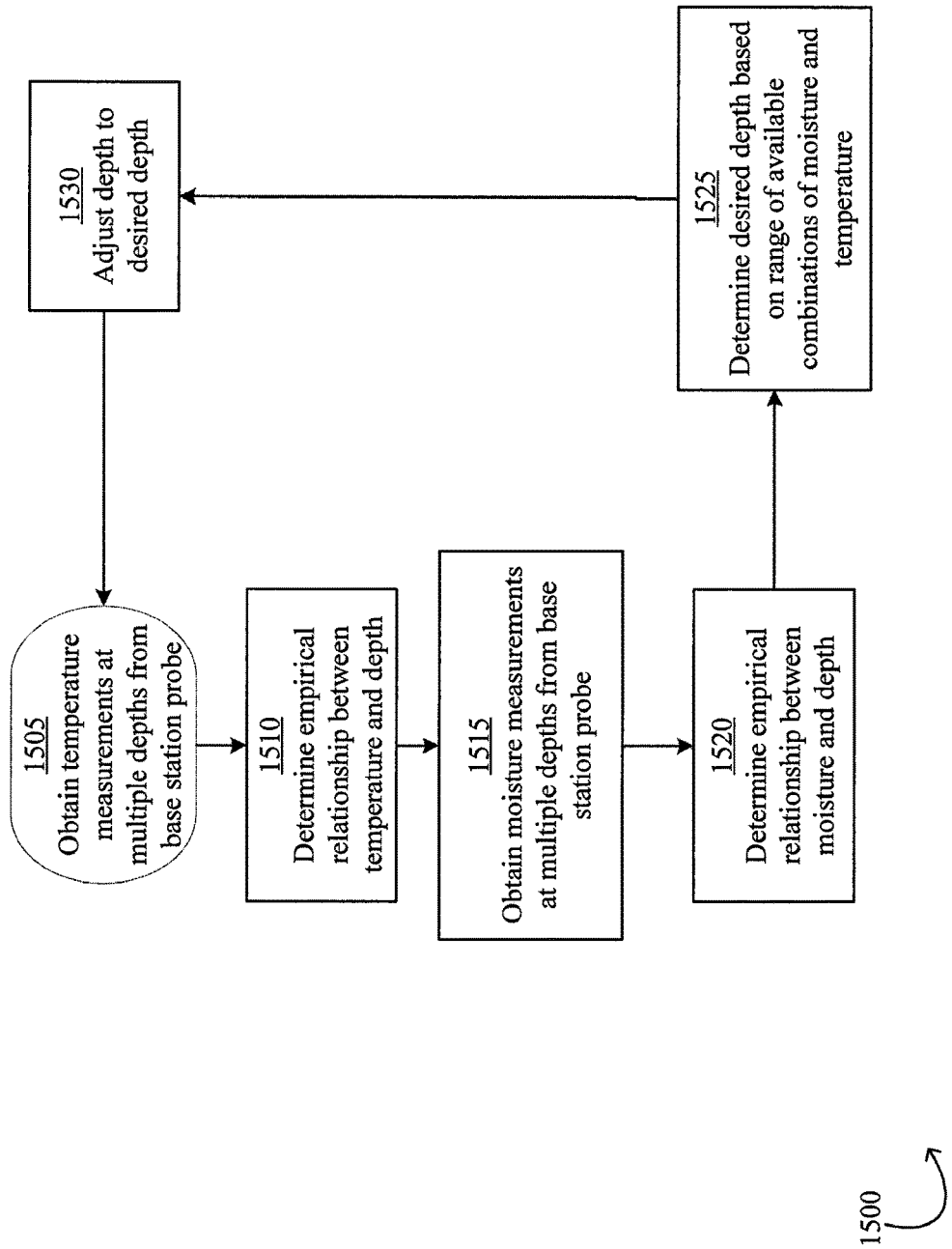
FIG. 15 illustrates an embodiment of a process for controlling trench depth based on soil moisture and soil moisture measurements made at a base station.

A process 1500 for controlling depth based on data received from the base station 325 is illustrated in FIG. 15. At step 1505, the system 300 preferably receives temperature measurements at multiple depths from the base station 325. At step 1510, the system 300 preferably determines an empirical relationship between depth and temperature, e.g., by determining a linear or other equation that best fits the temperature measurements at the base station 325. At step 1515, the system 300 preferably receives moisture measurements at multiple depths from the base station 325. At step 1520, the system 300 preferably determines an empirical relationship between depth and moisture, e.g., by determining a linear or other equation that best fits the moisture measurements at the base station 325. At step 1525, the system 300 preferably determines a desired depth based on the moisture and depth measurements received from the base station 325. In some embodiments, the system 300 selects a depth at which the loss L resulting from a lack of moisture and temperature is minimized, e.g., where the loss L is determined by the equation:

$$L = L_m + L_t$$

Where:
Lt=Tl−T for T<Tl, Lt=0 for T≥Tl;
Lm=15−Ml for M<Ml, Lm=0 for M≥Ml;
Ml is the minimum moisture level as described elsewhere herein, e.g., 15%; and
Tl is the minimum temperature described elsewhere herein, e.g., 50 degrees F.

The system 300 preferably selects a depth corresponding to the minimum L-value for all depths between the maximum depth Dmax and minimum depth Dmin. If the minimum value of L is within a threshold (e.g., 5%) of the maximum L-value, then the system 300 preferably selects a default depth (e.g., 1.75 inches) instead of the depth corresponding to the minimum L-value. At step 1530, the system 300 preferably adjusts the trench depth to the depth selected at step 1525.

Figure 16:
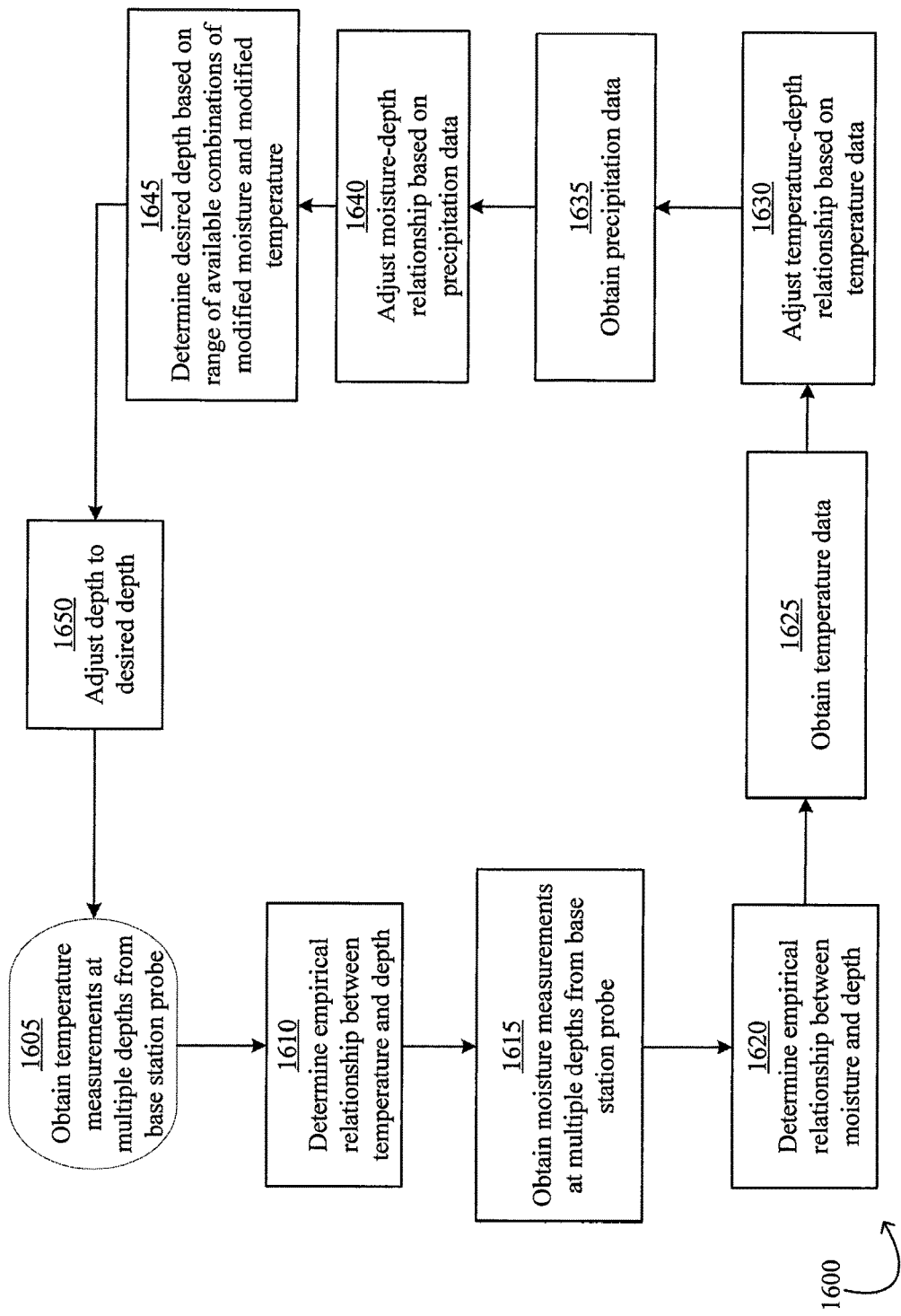
FIG. 16 illustrates an embodiment of a process for controlling trench depth based on weather data as well as soil moisture and soil moisture measurements made at a base station.

A process 1600 for controlling depth based on soil and moisture data and weather data is illustrated in FIG. 16. At step 1605, the system 300 preferably receives temperature measurements at multiple depths from the base station 325 as described above with respect to the process 1500. At step 1610, the system 300 preferably determines an empirical relationship between temperature and depth as described above with respect to the process 1500. At step 1615, the system 300 preferably receives moisture measurements at multiple depths from the base station 325 as described above with respect to the process 1500. At step 1620, the system 300 preferably determines an empirical relationship between moisture and depth as described above with respect to the process 1500. At step 1625, the system 300 receives temperature data, preferably from the base station 325 and/or the weather data server 340. The temperature data may include past recorded air temperature (e.g., recorded local air temperature during the previous 24 hours) as well as forecasted air temperature (e.g., forecasted local air temperature during the following 60 hours); the temperature data may also include recorded cloud conditions and forecasted cloud conditions. At step 1630, the system 300 preferably adjusts the temperature-depth relationship based on the temperature data. For example, in some embodiments the system 300 may adjust the temperature-depth relationship based on the local air temperature recorded during a period prior to planting and the forecasted temperature during the germination period (e.g., 60 hours) after planting. In one such embodiment, the system 300 modifies the temperature-depth relationship T(d) to a modified temperature-depth relationship T'(d) using the equation:

$$T'(d) = T(d) \times \frac{H_p}{H_f} \times \frac{\int_0^{H_f} A(h)dh}{\int_{-H_p}^0 A(h)dh}$$

Where:
A(h) is air temperature as a function of time in hours h;
Hp is the number of hours prior to planting over which recorded air temperature is used; and
Hf is the number of hours after planting over which forecasted air temperature is used.

Continuing to refer to process 1600 of FIG. 16, at step 1635 the system 300 receives precipitation data, preferably from the base station 325 and/or the weather data server 340. The precipitation data may include past recorded rainfall (e.g., recorded local rainfall during the previous 24 hours) as well as forecasted rainfall (e.g., forecasted local rainfall during the following 60 hours). At step 1640, the system 300 preferably adjusts the moisture-depth relationship based on the precipitation data. For example, in some embodiments the system 300 may adjust the moisture-depth relationship based on local rainfall recorded during a period prior to planting and the forecasted rainfall during the germination period (e.g., 60 hours) after planting. In one such embodiment, the system 300 modifies the moisture-depth relationship M(d) to a modified moisture-depth relationship M'(d) using the equation:

$$M'(d) = M(d) \times \frac{H_p}{H_f} \times \frac{\int_0^{H_f} R(h)dh}{\int_{-H_p}^0 R(h)dh}$$

Where:
R(h) is rainfall as a function of time in hours h;
Hp is the number of hours prior to planting over which recorded rainfall is used; and
Hf is the number of hours after planting over which forecasted rainfall is used.

Continuing to refer to process 1600 of FIG. 16, at step 1645 the system 300 preferably determines a desired depth based on the modified temperature-depth and modified moisture-depth relationships generated at steps 1630, 1640; in some embodiments, step 1645 is carried out as described herein with respect to step 1525 of process 1500. At step 1650, the system 300 preferably adjusts the trench depth to the desired depth.

Display and User Interface

Figure 17:
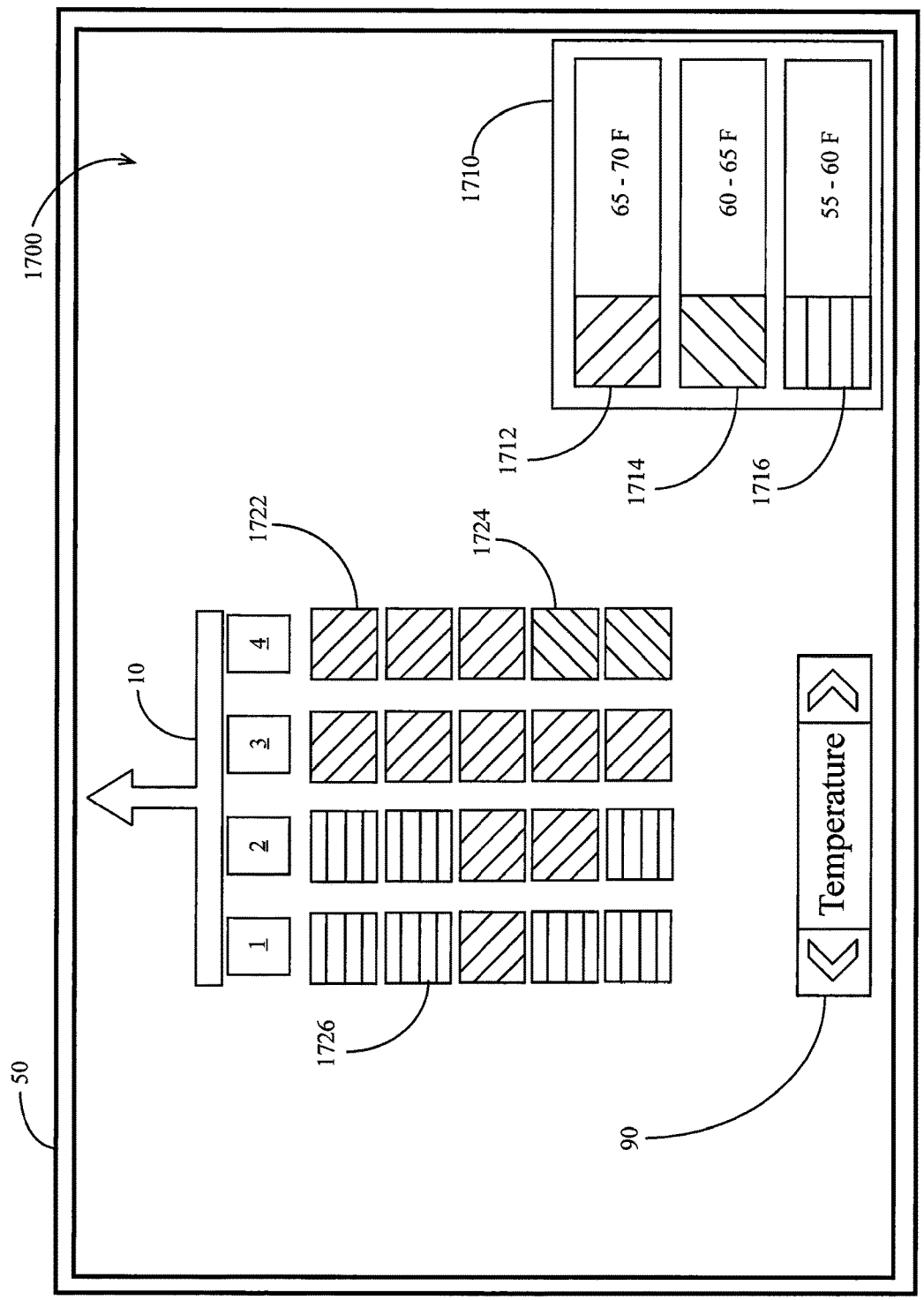
FIG. 17 illustrates an embodiment of a planter monitor screen displaying a soil temperature map.

As illustrated in FIG. 17, the monitor 50 is preferably configured to display a screen 1700 displaying spatial soil temperature data. The screen 1700 preferably displays the live position of the planter 10 and each of the associated row units 200 (numbered 1 through 4 in FIG. 17). In the embodiment of FIG. 17, temperature measurements are made at each row unit 200. Each temperature measurement is preferably time-stamped and associated with a GPS position; the screen 1700 preferably displays resulting temperature-location data points 1722, 1724, 1726 associated (e.g., by color or hatching) with legend ranges 1712, 1714, 1716, which are preferably illustrated in a legend 1710. An interface 90 preferably enables the user to navigate between map screens.

Figure 18:
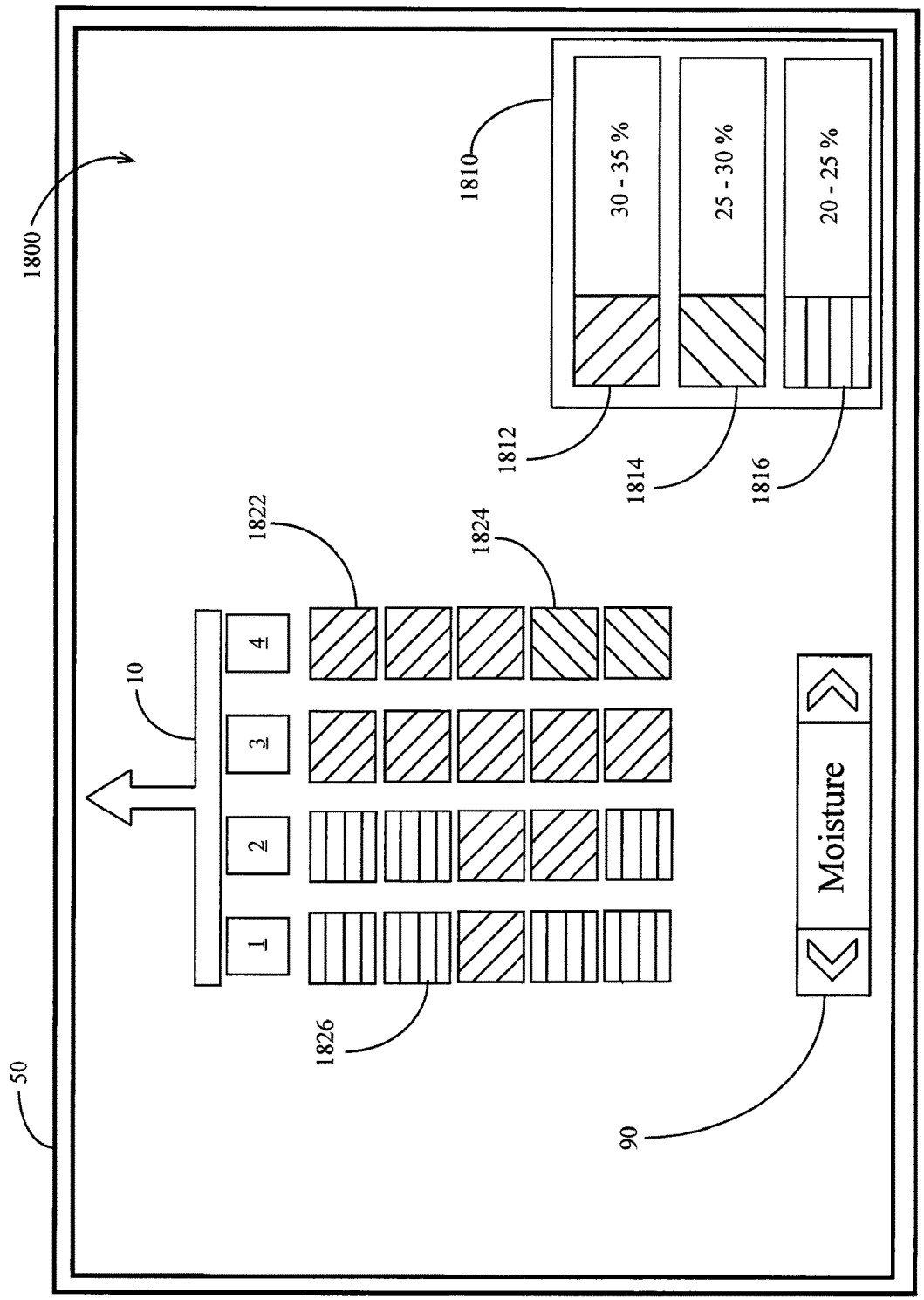
FIG. 18 illustrates an embodiment of a planter monitor screen displaying a soil moisture map.

As illustrated in FIG. 18, the monitor 50 is preferably configured to display a screen 1800 displaying spatial soil moisture data. The screen 1800 preferably displays the live position of the planter 10 and each of the associated row units 200 (numbered 1 through 4 in FIG. 18). In the embodiment of FIG. 18, moisture measurements are made at each row unit 200. Each moisture measurement is preferably time-stamped and associated with a GPS position; the screen 1800 preferably displays resulting moisture-location data points 1822, 1824, 1826 associated with legend ranges 1812, 1814, 1816, which are preferably illustrated in a legend 1810.

Figure 19:
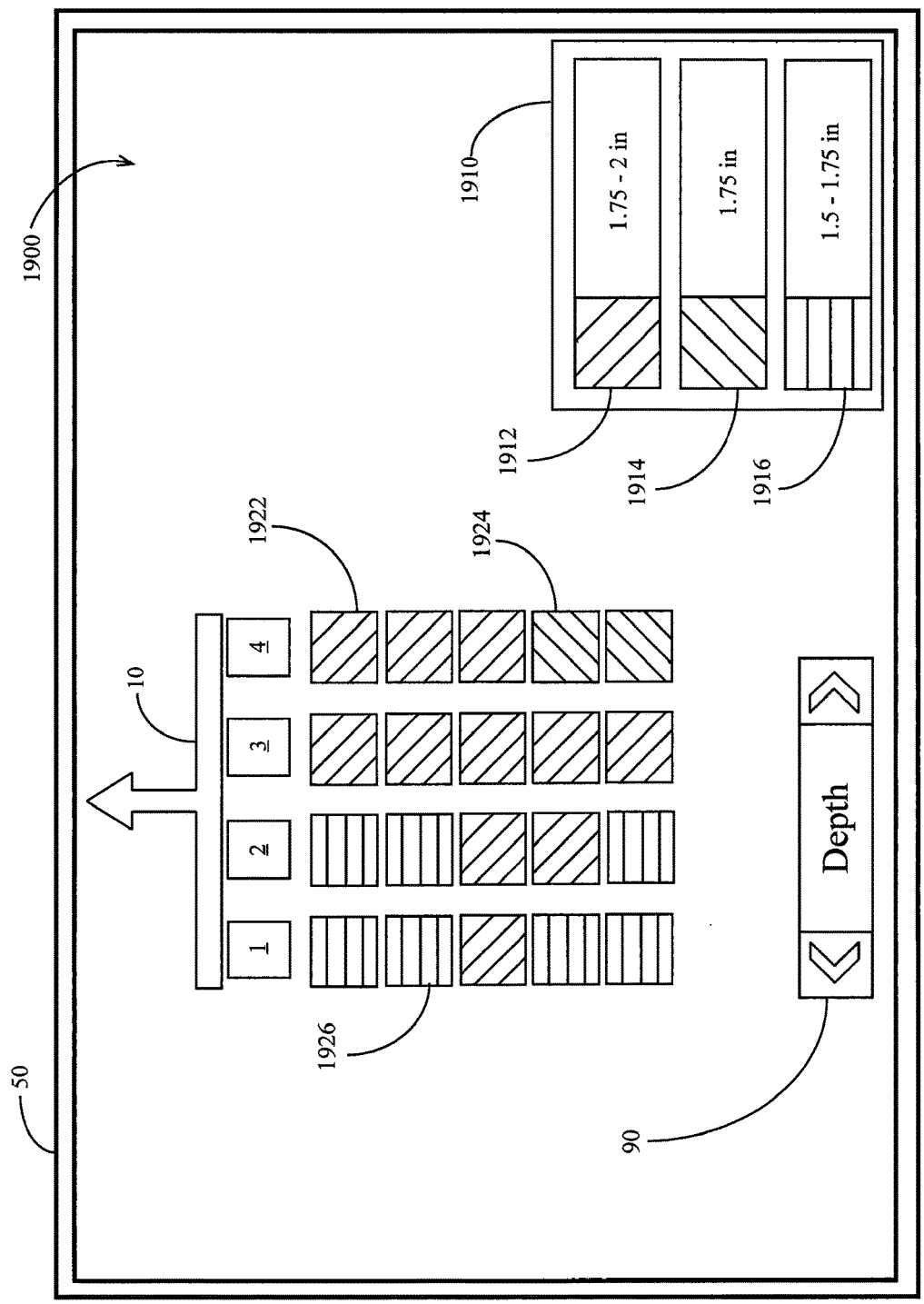
FIG. 19 illustrates an embodiment of a planter monitor screen displaying a trench depth map.

As illustrated in FIG. 19, the monitor 50 is preferably configured to display a screen 1900 displaying spatial trench depth data. The screen 1900 preferably displays the live position of the planter 10 and each of the associated row units 200 (numbered 1 through 4 in FIG. 19). In the embodiment of FIG. 19, trench depth measurements (or records of commanded trench depth) are made at each row unit 200. Each trench depth measurement is preferably time-stamped and associated with a GPS position; the screen 1900 preferably displays resulting depth-location data points 1922, 1924, 1926 associated with legend ranges 1912, 1914, 1916, which are preferably illustrated in a legend 1910.

In some embodiments, the screens 1700, 1800 and/or 1900 include a map overlay comprising spatial data from prior operations and/or prior seasons. The map overlay may be compared side-by-side with or partially transparent and superimposed over the temperature, moisture or depth data. In some embodiments the map overlay comprises aerial imagery (e.g., photographic, NDVI, plant emergence, or thermal imagery) previously captured for the same field. In other embodiments, the map overlay comprises application data (e.g., planting data gathered from seed sensors or nitrogen application rate data). In still other embodiments the map overlay comprises yield data recorded during harvest in a prior season.

Figure 20:
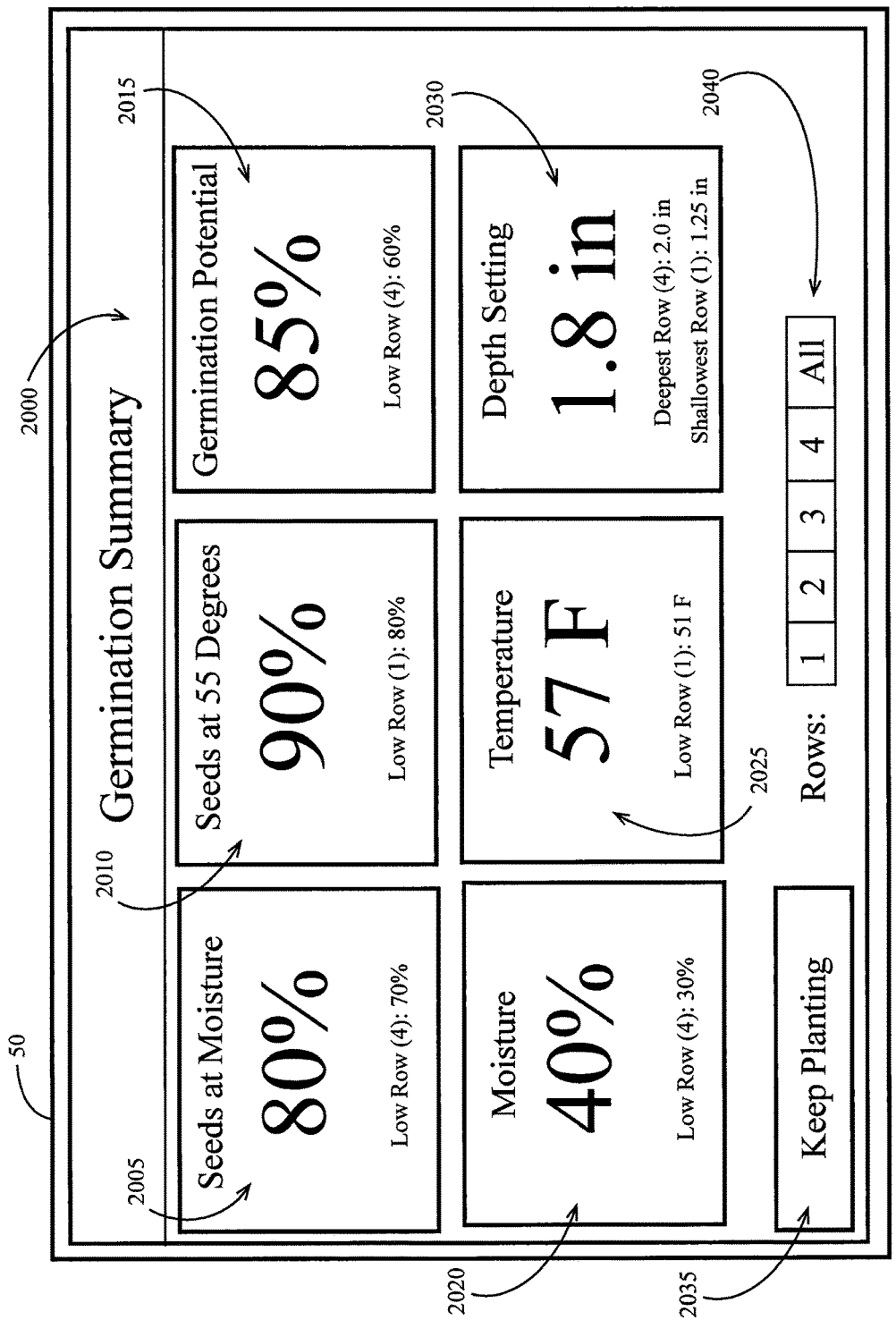
FIG. 20 illustrates an embodiment of a planter monitor screen displaying summarized planting data and planting recommendations.

Turning to FIG. 20, the monitor 50 is preferably configured to display a germination summary screen 2000. A window 2005 preferably displays the percentage of seeds S planted at a desired moisture level, which the monitor 50 preferably calculates according to the equation:

$$S = \frac{S_m}{S_t} \times 100\%$$

Where:
St is the total number of seeds planted during the current planting operation (e.g., in the current field); and Sm is the number of seeds planted within a threshold distance (e.g., 6 inches) of a GPS location associated with a moisture measurement of at least a threshold value (e.g., 15%).

In embodiments of the system 300 having a moisture sensor 350 at each row, the value of Sm is preferably determined on a row-by-row basis and then summed. In embodiments having fewer moisture sensors 350 than row units 200, each moisture sensor is associated with one or more row units and the value of Sm is determined on a row-by-row basis with each row unit using the moisture measurements of its associated moisture sensor. The monitor 50 also determines the value of S for each individual row and identifies the row having the lowest value of S in window 2005.

The germination summary screen 2000 also preferably includes a window 2010 displaying the percentage of seeds R planted at a desired temperature, which the monitor 50 preferably calculates according to the equation:

$$R = \frac{R_t}{S_t} \times 100\%$$

Where: Rt is the number of seeds planted within a threshold distance (e.g., 6 inches) of a GPS location associated with a temperature measurement of at least a threshold value (e.g., 55 degrees Fahrenheit).

In embodiments of the system 300 having a temperature sensor 360 at each row, the value of Rm is preferably determined on a row-by-row basis and then summed. In embodiments having fewer temperature sensors 360 than row units 200, each temperature sensor is associated with one or more row units and the value of Rm is determined on a row-by-row basis with each row unit using the temperature measurements of its associated temperature sensor. The monitor 50 also determines the value of R for each individual row and identifies the row having the lowest value of R in window 2010.

The screen 2000 also preferably includes a window 2015 displaying an estimate of the probability P of successful germination of seeds planted during the current planting operation (e.g., in the current field), which the monitor 50 preferably calculates using the equation:

$$P = \frac{R_t + S_m}{2S_t} \times 100\%$$

In embodiments of the system 300 having moisture sensors but no temperature sensors, the monitor 50 preferably calculates the germination probability P using the equation:

$$P = \frac{S_m}{S_t} \times 100\%$$

In embodiments of the system 300 having moisture sensors but no temperature sensors, the monitor 50 preferably calculates the germination probability P using the equation:

$$P = \frac{R_t}{S_t} \times 100\%$$

Continuing to refer to FIG. 20, the screen 2000 preferably includes a window 2020 displaying the average of the current moisture measurements obtained from the moisture sensors 350. The window 2020 preferably identifies the row unit or section (i.e., group of row units associated with a single moisture sensor 350) from which the lowest moisture measurement is obtained. The screen 2000 preferably includes a window 2025 displaying the average of the current temperature measurements obtained from the temperature sensors 360. The window 2025 preferably identifies the row unit or section (i.e., group of row units associated with a single temperature sensor 360) from which the lowest temperature measurement is obtained. The screen 2000 also preferably includes a window 2030 displaying the current average depth setting commanded to the depth adjustment actuators 380 (or in some embodiments, the current average actual depth measurement obtained from depth sensors 385). The window 2030 also preferably identifies the row units having the shallowest and deepest trench depths. The screen 2000 also preferably includes an interface 2040 enabling the user to navigate to row detail screens described later herein.

Continuing to refer to FIG. 20, the screen 2000 preferably includes a planting recommendation window 2035 displaying a recommendation indicating whether planting is recommended (e.g., "Keep Planting") or not recommended (e.g., "Stop Planting"). The monitor 50 preferably determines which recommendation to display based on current moisture and/or temperature measurements made by the system 300 or the average measurements made during the current planting operation (e.g., in the current field). In some embodiments the monitor recommends planting only if the loss L (calculated as described above) is less than a threshold, e.g., 20. In embodiments in which the system 300 includes moisture sensors 350 but no temperature sensors 360, the monitor 50 preferably recommends planting only if the moisture measurement displayed in window 2020 is greater than a threshold, e.g., 15%. In embodiments in which the system 300 includes temperature sensors 360 but no moisture sensors 350, the monitor 50 preferably recommends planting only if the temperature measurement displayed in window 2025 is greater than a threshold, e.g., 55 degrees Fahrenheit.

It should be appreciated that the moisture and temperature values displayed in the screen 2000 and used to calculate the germination potential value (window 2015) and determine the planting recommendation (window 2035) may be adjusted based on weather data as described earlier herein.

Figure 21:
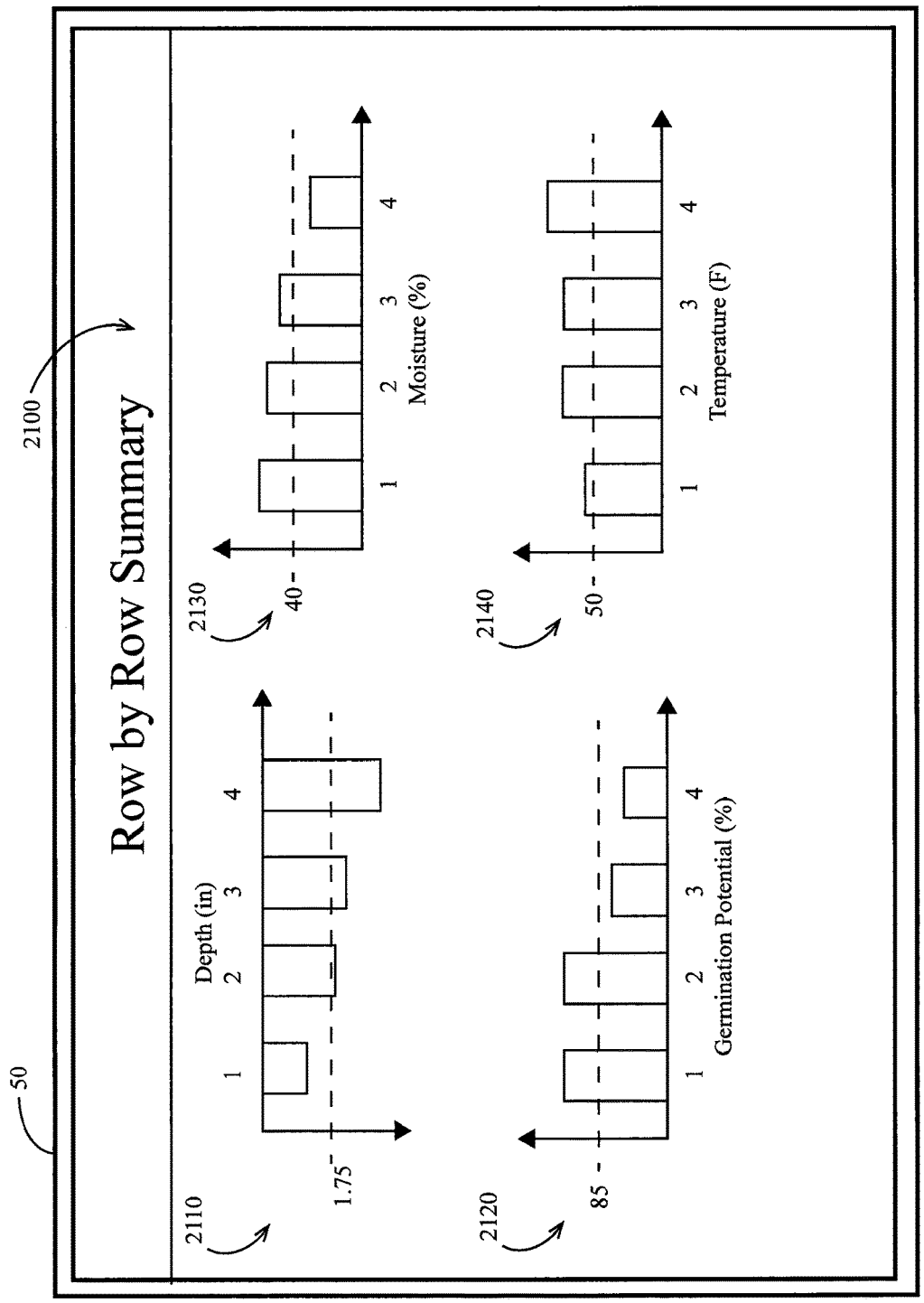
FIG. 21 illustrates an embodiment of a planter monitor screen displaying row-by-row planting data.

Turning to FIG. 21, the monitor 50 is preferably configured to display a row by row summary screen 2100. The screen 2100 preferably includes a graph 2110 illustrating the trench depth at each row unit, a graph 2130 illustrating the moisture measured at each row unit, a graph 2120 illustrating the germination potential determined for each row unit, and a graph 2140 illustrating the temperature measured at each row unit.

Figure 22:
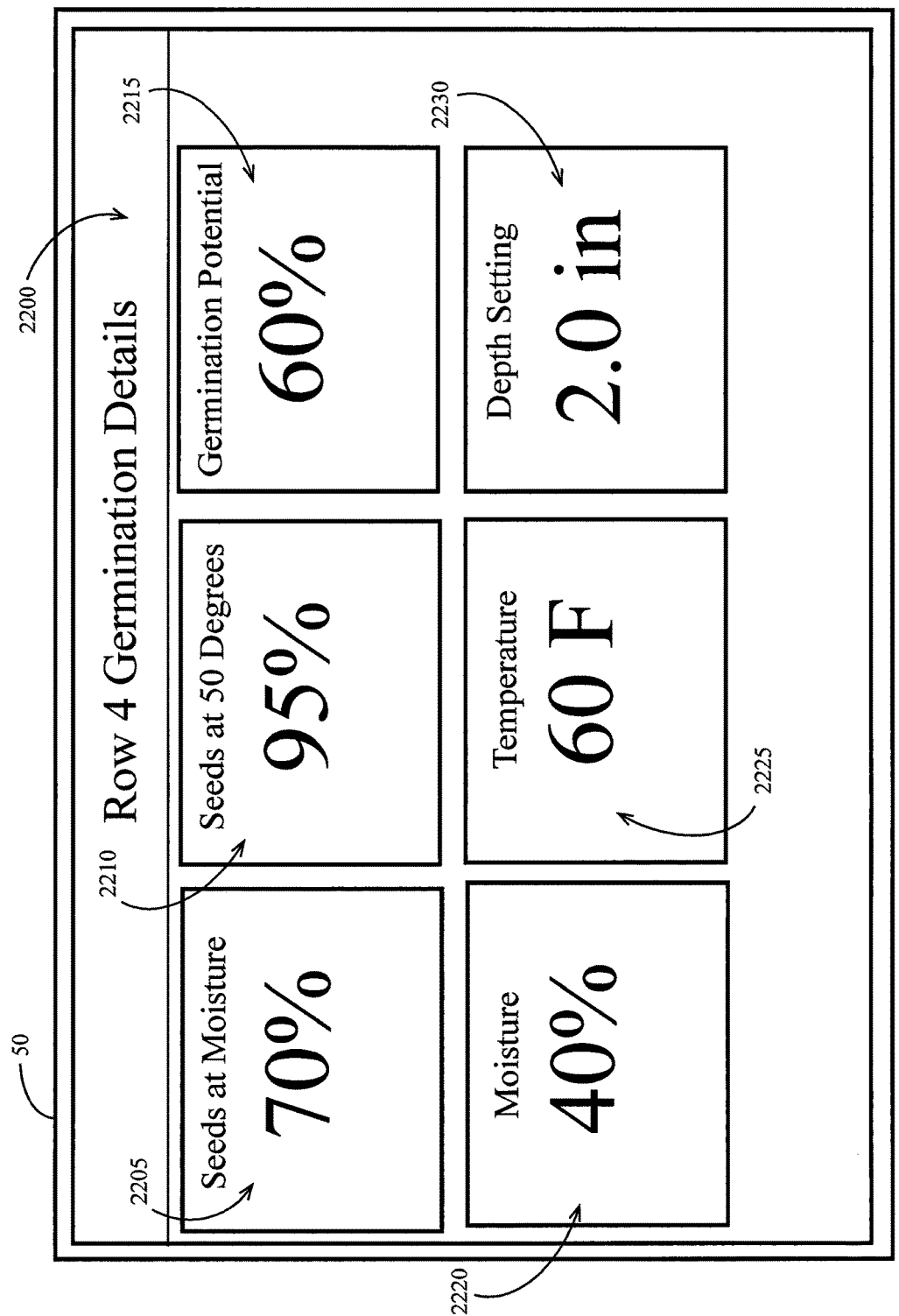
FIG. 22 illustrates an embodiment of a planter monitor screen displaying row-specific planting data.

Turning to FIG. 22, the monitor 50 is preferably configured to display a row details screen 2200 for each row unit 200. The row details screen preferably includes windows 2205, 2210, 2215, 2220, 2225, 2230 displaying individual row values used to calculate the average values displayed in windows 2005, 2010, 2015, 2020, 2025, 2030, respectively, of the screen 2000.

Figure 23:
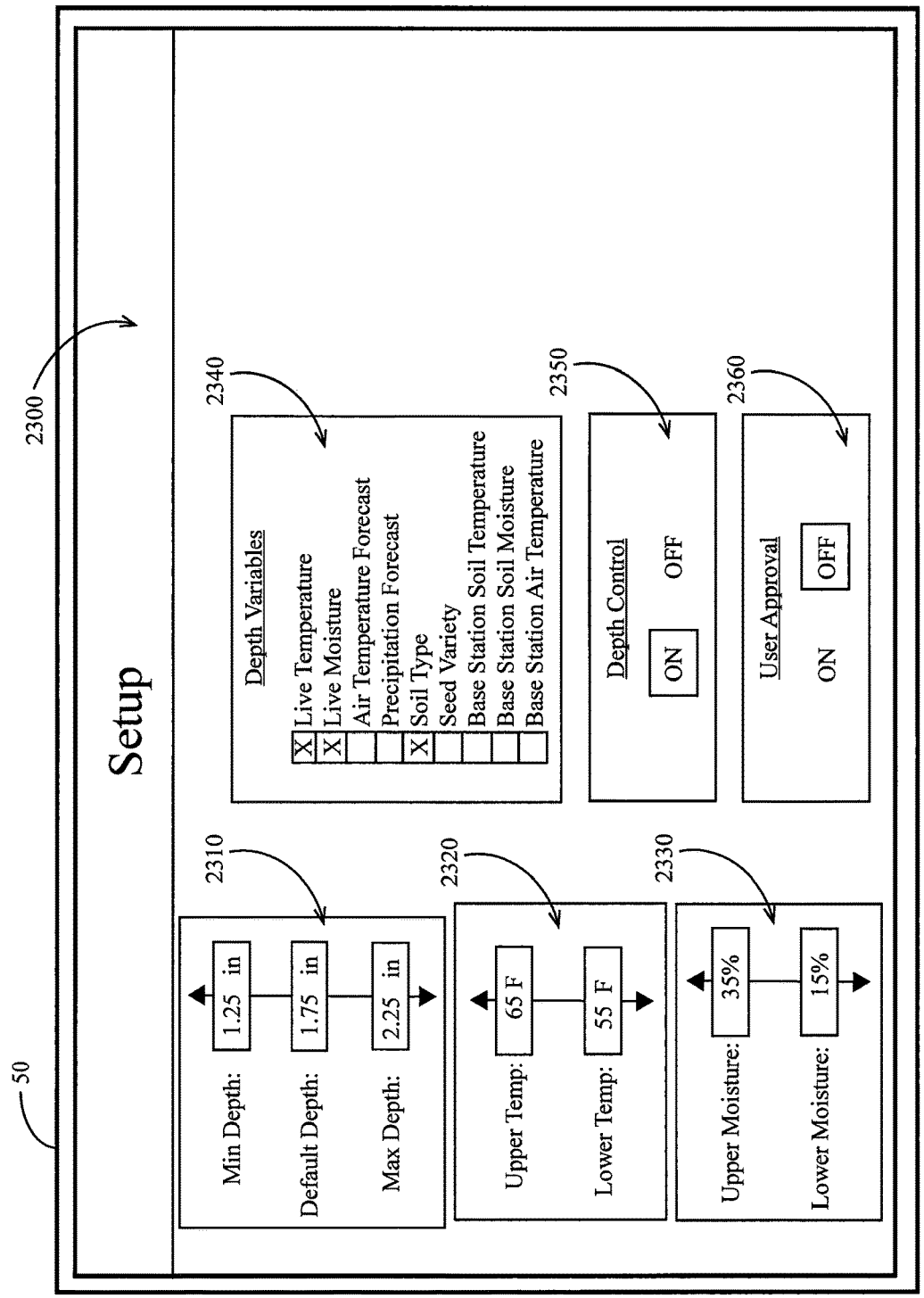
FIG. 23 illustrates an embodiment of a planter monitor depth control setup screen.

Turning to FIG. 23, the monitor 50 is preferably configured to display a setup screen 2300 enabling the user to vary the parameters used in the depth control processes described herein. The screen 2300 preferably includes a depth interface 2310 for setting the minimum depth Dmin, the default depth Dd, and the maximum depth Dmax. The screen 2300 preferably includes a temperature interface 2320 for setting the high temperature Th and the low temperature Tl. The screen 2300 preferably includes a moisture interface 2330 for setting a high moisture Mh and a low moisture Ml. The screen 2300 preferably includes an interface 2340 enabling the user to select which variables are used to control depth. The monitor 50 is preferably configured to select a depth control process which uses the variables selected by the user as in puts and does not require the variables not selected by the user. For example, if the user selects only "Live Moisture", the system 300 preferably uses the process 500 to control trench depth, whereas if the user selects only "Live Moisture" and "Live Temperature", the system 300 preferably uses one of the processes 700, 800, or 800' to control trench depth.

Continuing to refer to FIG. 23, the screen 2300 preferably includes a depth control interface 2350 enabling allowing the user to turn off all of the depth control processes (e.g., by selecting "Off") such that the system 300 leaves the trench depth at each row unit 200 at the current setting (or in some embodiments, returns each row unit to the default depth Dd). The screen 2300 also preferably includes a user approval interface 2360 enabling the user to select whether the monitor 50 requests user approval before requesting. If the user selects "On" in the interface 2360, then the monitor 50 preferably prompts the user to approve or reject changes in depth requested by the depth control processes described herein (e.g., by a window superimposed over the active screen).

Figure 27:
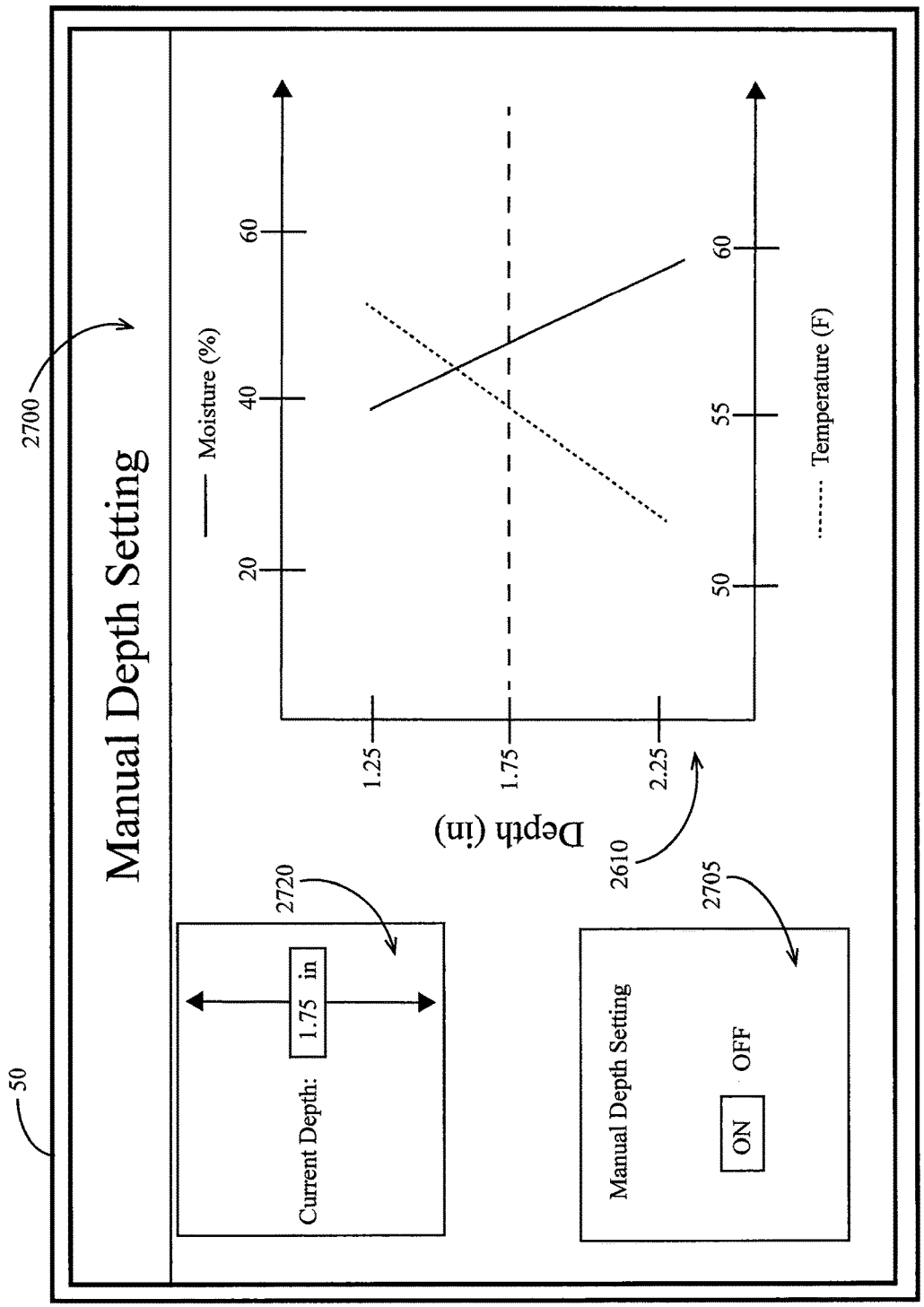
FIG. 27 illustrates an embodiment of a planter monitor screen for setting trench depth and displaying soil data.

Turning to FIG. 27, the monitor 50 is preferably configured to display a screen 2700 for manually setting trench depth and preferably for viewing moisture and temperature data. The screen 2700 preferably displays a graph 2710 illustrating the relationship between depth and moisture and between depth and temperature. The depth-temperature relationship illustrated in the graph 2710 is preferably generated by averaging the temperature measurements made by the system 300 at various depths. The depth-moisture relationship illustrated in the graph 2720 is preferably generated by averaging the moisture measurements made by the system 300 at various depths. It should be appreciated that the graph 2620 assists the user in selecting a depth at which the desired moisture and temperature are available. The screen 2700 preferably displays a depth interface (e.g., a sliding interface as illustrated) allowing the user to set a trench depth; the system 300 preferably adjusts the trench depth at each row unit to the manually selected trench depth if a manual override interface 2605 is set to "On".

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A control and monitoring system for an agricultural implement having a plurality of row units, comprising:

a depth control actuator associated with at least one of the plurality of row units and configured to adjust a depth of a trench opened by the at least one of the plurality of row units;
a seed firmer having a lower portion resiliently contacting a bottom of said trench and capable of firming seeds into the bottom of said trench;
a soil temperature sensor associated with the at least one of the plurality of row units and configured to measure soil temperature at a lower portion of said trench, wherein said soil temperature sensor is mounted to said seed firmer and is in contact with said lower portion of said trench; and
a processor in electrical communication with said depth control actuator and said soil temperature sensor, said depth control actuator responsive to said processor to modify said depth of said trench based on said measured soil temperature.

2. The control and monitoring system of claim 1, wherein said soil temperature sensor comprises a thermocouple.

3. The control and monitoring system of claim 1, further comprising:
a soil moisture sensor associated with the at least one of the plurality of row units and configured to measure moisture at the bottom of said trench, wherein said processor is in electrical communication with said soil moisture sensor, said depth control actuator responsive to said processor to modify said depth of said trench based on said measured soil moisture.

4. The control and monitoring system of claim 1, wherein said soil temperature sensor is housed at least partially within said seed firmer.

5. The control and monitoring system of claim 1, wherein said processor compares said measured soil temperature to a desired temperature range and reduces said depth if said measured soil temperature is less than said desired temperature range.

6. The control and monitoring system of claim 1, wherein said processor causes said depth control actuator to reduce said depth of said trench to a modified depth and determines whether said measured soil temperature is greater at said modified depth, and wherein said processor causes said depth control actuator to increase said depth of said trench if said measured soil temperature is not greater at said modified depth.

7. A control and monitoring system for an agricultural implement having a plurality of row units, comprising:
a depth control actuator associated with at least one of the plurality of row units and configured to adjust a depth of a trench opened by the at least one of the plurality of row units;
a seed firmer having a lower portion resiliently contacting a bottom of said trench and capable of firming seeds into the bottom of said trench;
a soil moisture sensor associated with the at least one of the plurality of row units and configured to measure soil moisture at a lower portion of said trench, wherein said soil moisture sensor is mounted to said seed firmer and is in contact with said lower portion of said trench; and
a processor in electrical communication with said depth control actuator and said soil moisture sensor, said depth control actuator responsive to said processor to modify said depth of said trench based on said measured soil moisture.

8. The control and monitoring system of claim 7, wherein said soil moisture sensor comprises a reflectivity sensor.

9. The control and monitoring system of claim 7, wherein said soil moisture sensor is housed at least partially within said seed firmer.

10. The control and monitoring system of claim 9, further comprising:
a soil temperature sensor associated with the at least one of the plurality of row units and configured to measure a temperature at the bottom of said trench, wherein said processor is in electrical communication with said soil moisture sensor, said depth control actuator responsive to said processor to modify said depth of said trench based on said measured soil temperature.

11. The control and monitoring system of claim 10, wherein said soil temperature sensor is housed at least partially within said seed firmer.

12. The control and monitoring system of claim 7, wherein said processor compares said measured moisture to a desired moisture range and causes said depth control actuator to increase said depth of said trench if said measured soil moisture is less than said desired moisture range.

13. The control and monitoring system of claim 7, wherein said processor causes said depth control actuator to increase said depth of said trench to a modified depth and determines whether said soil moisture is greater at said modified depth, and wherein said processor causes said depth control actuator to reduce said depth of said trench if said measured soil moisture is not greater at said modified depth.

14. A monitoring system for an agricultural implement having a plurality of row units, comprising:
a soil temperature sensor associated with at least one of the plurality of row units and configured to measure a soil temperature at a lower portion of a trench opened by the at least one of the plurality row units;
a processor in electrical communication with said soil temperature sensor;
a display in electrical communication with said processor, said display displaying said measured soil temperature; and
a seed firmer disposed to firm seeds in said trench, a lower portion of said seed firmer resiliently contacting a bottom of said trench and capable of firming seeds into the bottom of said trench, wherein said soil temperature sensor is mounted to said seed firmer and is in contact with a lower portion of said trench.

15. The monitoring system of claim 14, wherein said soil temperature sensor comprises a thermocouple.

16. The monitoring system of claim 14, further comprising:
a soil moisture sensor associated with at least one of the plurality of row units and configured to measure soil moisture at the bottom of said trench, wherein said processor is in electrical communication with said soil moisture sensor, said display displaying said measured soil moisture.

17. The monitoring system of claim 16, wherein said soil moisture sensor is housed at least partially within said seed firmer.

18. A monitoring system for an agricultural implement having a plurality of row units, comprising:
a soil moisture sensor associated with at least one of the plurality of row units and configured to measure soil moisture at a lower portion of a trench opened by the at least one of the plurality of row units;
a processor in electrical communication with said soil moisture sensor;

a display in electrical communication with said processor, said display displaying said measured soil moisture; and a seed firmer disposed to firm seeds in said trench, a lower portion of said seed firmer resiliently contacting a bottom of said trench and capable of firming seeds into the bottom of said trench, wherein said soil moisture sensor is mounted to said seed firmer and is in contact with a lower portion of said trench.

19. The monitoring system of claim 18, further comprising:

a soil temperature sensor associated with the at least one of the plurality of row units and configured to measure soil temperature at the bottom of said trench, wherein said processor is in electrical communication with said soil temperature sensor, said display displaying said measured soil moisture.

20. The monitoring system of claim 19, wherein said soil temperature sensor is housed at least partially within said seed firmer.

\* \* \* \* \*